(12) United States Patent
Yoshii et al.

(10) Patent No.: US 12,536,136 B2
(45) Date of Patent: Jan. 27, 2026

(54) STORAGE SYSTEM AND DATA PROCESSING METHOD

(71) Applicant: Hitachi Vantara, Ltd., Yokohama (JP)

(72) Inventors: Yoshihiro Yoshii, Tokyo (JP); Takashi Nagao, Tokyo (JP); Tomohiro Yoshihara, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 0 days.

(21) Appl. No.: 18/828,037

(22) Filed: Sep. 9, 2024

(65) Prior Publication Data
US 2025/0173310 A1 May 29, 2025

(30) Foreign Application Priority Data
Nov. 28, 2023 (JP) ................................. 2023-200544

(51) Int. Cl.
*G06F 16/11* (2019.01)
*G06F 16/174* (2019.01)
*G06F 16/188* (2019.01)

(52) U.S. Cl.
CPC ........ *G06F 16/128* (2019.01); *G06F 16/1744* (2019.01); *G06F 16/188* (2019.01)

(58) Field of Classification Search
CPC ... G06F 16/128; G06F 16/188; G06F 16/1744
See application file for complete search history.

(56) References Cited

U.S. PATENT DOCUMENTS

| | | | |
|---|---|---|---|
| 8,352,785 B1 * | 1/2013 | Nicklin | G06F 16/188 707/649 |
| 10,817,209 B2 | 10/2020 | Matsushita et al. | |
| 2007/0009163 A1 * | 1/2007 | Sasaki | H04N 19/126 375/E7.14 |
| 2020/0241763 A1 * | 7/2020 | Armangau | G06F 3/0683 |

* cited by examiner

*Primary Examiner* — Loc Tran
(74) *Attorney, Agent, or Firm* — Foley & Lardner LLP

(57) ABSTRACT

A processor uses a snapshot virtual device as a storage destination for data of a primary volume and a snapshot volume, compresses data stored in the snapshot virtual device and stores the compressed data in a compression virtual device, and stores the data stored in the compression virtual device in a storage device. When a write request is received from a host, the processor switches, according to a size of an address range of a write destination, between overwriting processing of overwriting an area on the snapshot virtual device which is allocated to large-size data and new allocation processing of allocating a new area on the snapshot virtual device to the address range of the write destination for small-size data, and compresses a plurality of pieces of small-size data stored in the new area and collectively stores the plurality of pieces of small-size data in the compression virtual device.

9 Claims, 28 Drawing Sheets

HARDWARE CONFIGURATION

FIG. 8

OWNERSHIP MANAGEMENT TABLE
1001

| VOL#/VDEV# (1201) | OWNER CPU # (1202) |
|---|---|
| 0x0000 | 0 |
| 0x00f0 | 1 |
| ... | ... |

FIG. 9

CR-VDEV MANAGEMENT TABLE
1002

| VDEV# (1301) | CR-VDEV# (1302) |
|---|---|
| 0x0000 | 0x0100 |
| 0x00f0 | 0x0f90 |
| ... | ... |

FIG. 10

Snapshot MANAGEMENT TABLE
1003

| PVOL# | SVOL# | ACQUISITION TIME |
|---|---|---|
| 0 | 0x010 | t0 |
| 0 | 0x020 | t1 |
| 0 | 0x030 | t2 |
| 0 | 0x040 | t3 |
| ... | ... | ... |

FIG. 11

VOL-Dir MANAGEMENT TABLE
1004

| VOL# | Root-VOL# | Dir-Info# |
|---|---|---|
| 0x0000 | 0x0000 | 0x0000 |
| 0x0001 | 0x0001 | 0x0005 |
| ... | ... | ... |
| 0x0010 | 0x0000 | 0x0001 |
| 0x0020 | 0x0000 | 0x0002 |
| ... | ... | ... |

PVOL# { (rows 0x0000, 0x0001, ...)
SVOL# { (rows 0x0010, 0x0020, ...)

FIG. 12

LATEST GENERATION TABLE
1005

| LATEST GENERATION # |
|---|
| 100 |

FIG. 13

COLLECTION MANAGEMENT TABLE
1006

| Dir-Info# | COLLECTION REQUEST |
|---|---|
| 0x0000 | 0 |
| 0x0001 | 1 |
| ... | ... |
| 0xFFFF | 0 |

GENERATION MANAGEMENT TREE TABLE
1007

| Dir-Info# 1801 | GENERATION # 1802 | Prev 1803 | Next-A 1804A | Next-B 1804B |
|---|---|---|---|---|
| 0x0000 | 3 | 0x0001 | — | — |
| 0x0001 | 1 | 0x0003 | 0x0002 | 0x0000 |
| 0x0002 | 2 | 0x0001 | — | — |
| 0x0003 | 0 | — | 0x0001 | — |
| ... | ... | | | |
| 0xFFFF | — | | | |

Snapshot ALLOCATION MANAGEMENT TABLE
1008

| Block Address 1901 | Status 1902 | ALLOCATION DESTINATION VOL # 1903 | ALLOCATION DESTINATION Address 1904 |
|---|---|---|---|
| 0 | 1 | 0x0001 | 0 |
| 1 | 0 | n/a | n/a |
| 2 | 1 | 0x0010 | 100 |
| 3 | 0 | n/a | n/a |
| 4 | 1 | 0x0020 | 100 |
| ... | ... | ... | ... |

FIG. 16

Dir MANAGEMENT TABLE
1009

| VOL/VEDV ADDRESS (2001) | REFERENCE DESTINATION Mapping-Info # (2002) |
|---|---|
| 0x00000000 | 0 |
| 0x00000200 | 1 |
| 0x00000400 | 2 |
| ... | ... |

FIG. 17

SS-Mapping MANAGEMENT TABLE
1010

| Mapping-Info# (2101) | REFERENCE DESTINATION ADDRESS (2102) | REFERENCE DESTINATION SS-VDEV # (2103) | GENERATION # (2104) |
|---|---|---|---|
| 0 | 2 | 0x10 | 2 |
| 1 | 5 | 0x10 | 3 |
| 2 | 10 | 0x10 | 1 |
| ... | ... | ... | ... |

FIG. 18

COMPRESSION ALLOCATION MANAGEMENT TABLE
1011

| Sub-block Address (2201) | DATA LENGTH (2202) | Status (2203) | HEAD Sub-block Address (2204) | ALLOCATION DESTINATION VDEV # (2205) | ALLOCATION DESTINATION Address (2206) |
|---|---|---|---|---|---|
| 0 | 2 | 1 | 0 | 0x0010 | 0 |
| 1 | - | 1 | 0 | n/a | n/a |
| 2 | 1 | 2 | 2 | 0x010 | 100 |
| 3 | 1 | 1 | 3 | 0x010 | 100 |
| 4 | - | 0 | - | n/a | n/a |
| ... | ... | ... | ... | ... | ... |

FIG. 19

CR-Mapping MANAGEMENT TABLE
1012

| Mapping-Info# (2301) | REFERENCE DESTINATION Address (2302) | REFERENCE DESTINATION CR-VDEV # (2303) | DATA LENGTH (2304) |
|---|---|---|---|
| 0 | 2 | 0x1010 | 2 |
| 1 | 5 | 0x1010 | 3 |
| 2 | 10 | 0x1010 | 1 |
| ... | ... | ... | ... |

FIG. 20

Dedup-Dir MANAGEMENT TABLE
1013

| Dedup-VDEV Address (2401) | REFERENCE DESTINATION ALLOCATION INFORMATION # (2402) |
|---|---|
| 0 | 0 |
| 1 | 1 |
| ... | |

FIG. 21

Dedup ALLOCATION MANAGEMENT TABLE
1014

| ALLOCATION INFORMATION # (2501) | ALLOCATION DESTINATION SS-VDEV # (2502) | ALLOCATION DESTINATION Address (2503) | CONCATENATED ALLOCATION INFORMATION # (2504) |
|---|---|---|---|
| 0 | 0x0010 | 0 | 2 |
| 1 | 0x0010 | 1 | 3 |
| 2 | 0x0020 | 100 | 14 |
| 3 | 0x0020 | 200 | - |
| ... | ... | ... | ... |

FIG. 22
Pool-Mapping MANAGEMENT TABLE
1015

| VDEV ADDRESS | Page# |
|---|---|
| 0x00000000 | 2 |
| 0x00000200 | 5 |
| 0x00000400 | 10 |
| ... | ... |

(2601) (2602)

FIG. 23
Pool ALLOCATION MANAGEMENT TABLE
1016

| Page# | RG# | HEAD Address | Status | ALLOCATION DESTINATION VDEV # | ALLOCATION DESTINATION Address |
|---|---|---|---|---|---|
| 0 | 0 | 0 | 1 | 0x1010 | 0 |
| 1 | 0 | 100 | 0 | n/a | n/a |
| 2 | 0 | 200 | 1 | 0x1020 | 100 |
| 3 | 1 | 0 | 0 | n/a | n/a |
| 4 | 1 | 100 | 1 | 0x1010 | 100 |
| ... | ... | ... | ... | ... | ... |

(2701) (2702) (2703) (2704) (2705) (2706)

STORAGE SYSTEM AND DATA PROCESSING METHOD

BACKGROUND OF THE INVENTION

1. Field of the Invention

The present invention relates to a storage system and a data processing method.

2. Description of Related Art

In recent years, the need for data utilization has increased, and the opportunity of data duplication has increased. Accordingly, a snapshot function is becoming more important in a storage system. In the related art, there is a redirect on write (RoW) method as a representative implementation method of a snapshot. Since there is no copy of data or meta information, the Row method has an advantage that an influence on an I/O performance at the time of creating the snapshot is small. The RoW system is often adopted in an all flash array (AFA) device. The Row method is a method of tracking data. The tracking is a data storage method in which, when data is written to the storage system, the data stored before the writing is not overwritten, the write target data is stored in a new area, and the meta information is rewritten to refer to the data stored in the new area.

In such data management to which a deduplication technique or a snapshot technique is applied, when an address in a virtual device of data is changed due to garbage collection or another reason, in a case where the address is a reference destination for a plurality of different addresses in a plurality of snapshot families, it is necessary to change a reference destination address for each of the plurality of addresses. Therefore, it takes a long time to change address mapping, and as a result, a time of the entire processing involving the change of the address mapping is long.

PTL 1 discloses a method of improving efficiency of garbage collection processing by reducing the number of references to duplicate data, by allocating, to a virtual space different from a storage destination for independent data referred to only from one VOL, data shared from a plurality of VOLs by deduplication or a snapshot.

CITATION LIST

Patent Literature

PTL 1: U.S. patent application Ser. No. 10/817,209

SUMMARY OF THE INVENTION

However, when a virtual device space is added as in PTL 1, there is a problem that mapping information to be referred to and updated when read and write IO processing is performed increases, and thus a load on a storage controller increases and a throughput decreases.

Accordingly, an object of the invention is to implement both a garbage collection performance and a high throughput by efficiently using resources of a virtual device.

In order to achieve the above object, one representative storage system of the invention includes: a storage device; and a processor configured to access the storage device. The processor manages, as a snapshot family, a primary volume to be read and written by a host and a snapshot volume generated from the primary volume. The processor uses a snapshot virtual device, which is a logical address space associated with the snapshot family, as a storage destination for data of the primary volume and the snapshot volume, compresses data stored in the snapshot virtual device and stores the compressed data in a compression virtual device, and stores the data stored in the compression virtual device in the storage device. When a write request is received from the host, the processor switches, according to a size of an address range of a write destination, between overwriting processing of overwriting an area on the snapshot virtual device which is allocated to large-size data and new allocation processing of allocating a new area on the snapshot virtual device to the address range of the write destination for small-size data, and compresses a plurality of pieces of small-size data stored in the new area and collectively stores the plurality of pieces of small-size data in the compression virtual device.

One representative data processing method of the invention is a data processing method for a storage system including a storage device and a processor for accessing the storage device. The data processing method includes: by the processor, managing, as a snapshot family, a primary volume to be read and written by a host and a snapshot volume generated from the primary volume; using a snapshot virtual device, which is a logical address space associated with the snapshot family, as a storage destination for data of the primary volume and the snapshot volume; compressing data stored in the snapshot virtual device, and storing the compressed data in a compression virtual device; storing the data stored in the compression virtual device in the storage device; and when a write request is received from the host, switching, according to a size of an address range of a write destination, between overwriting processing of overwriting an area on the snapshot virtual device which is allocated to large-size data and new allocation processing of allocating a new area on the snapshot virtual device to the address range of the write destination for small-size data, compressing a plurality of pieces of small-size data stored in the new area, and collectively storing the plurality of pieces of small-size data in the compression virtual device.

According to the invention, a high throughput can be implemented by efficiently using resources of a virtual device. Problems, configurations, and effects other than those described above will become apparent by the following description of embodiments.

BRIEF DESCRIPTION OF THE DRAWINGS

FIG. 8 shows a configuration of an ownership management table.

FIG. 9 shows a configuration of a CR-VDEV management table.

FIG. 10 shows a configuration of a snapshot management table.

FIG. 11 shows a configuration of a VOL-Dir management table.

FIG. 12 shows a configuration of a latest generation table.

FIG. 13 shows a configuration of a collection management table.

FIG. 16 shows a configuration of a Dir management table.

FIG. 17 shows a configuration of an SS-Mapping management table.

FIG. 18 shows a configuration of a compression allocation management table.

FIG. 19 shows a configuration of a CR-Mapping management table.

FIG. 20 shows a configuration of a Dedup-Dir management table.

FIG. 21 shows a configuration of a Dedup allocation management table.

FIG. 22 shows a configuration of a Pool-Mapping management table.

FIG. 23 shows a configuration of a Pool allocation management table.

DESCRIPTION OF EMBODIMENTS

Hereinafter, an embodiment will be described with reference to the drawings.

Embodiment 1

Figure 1:
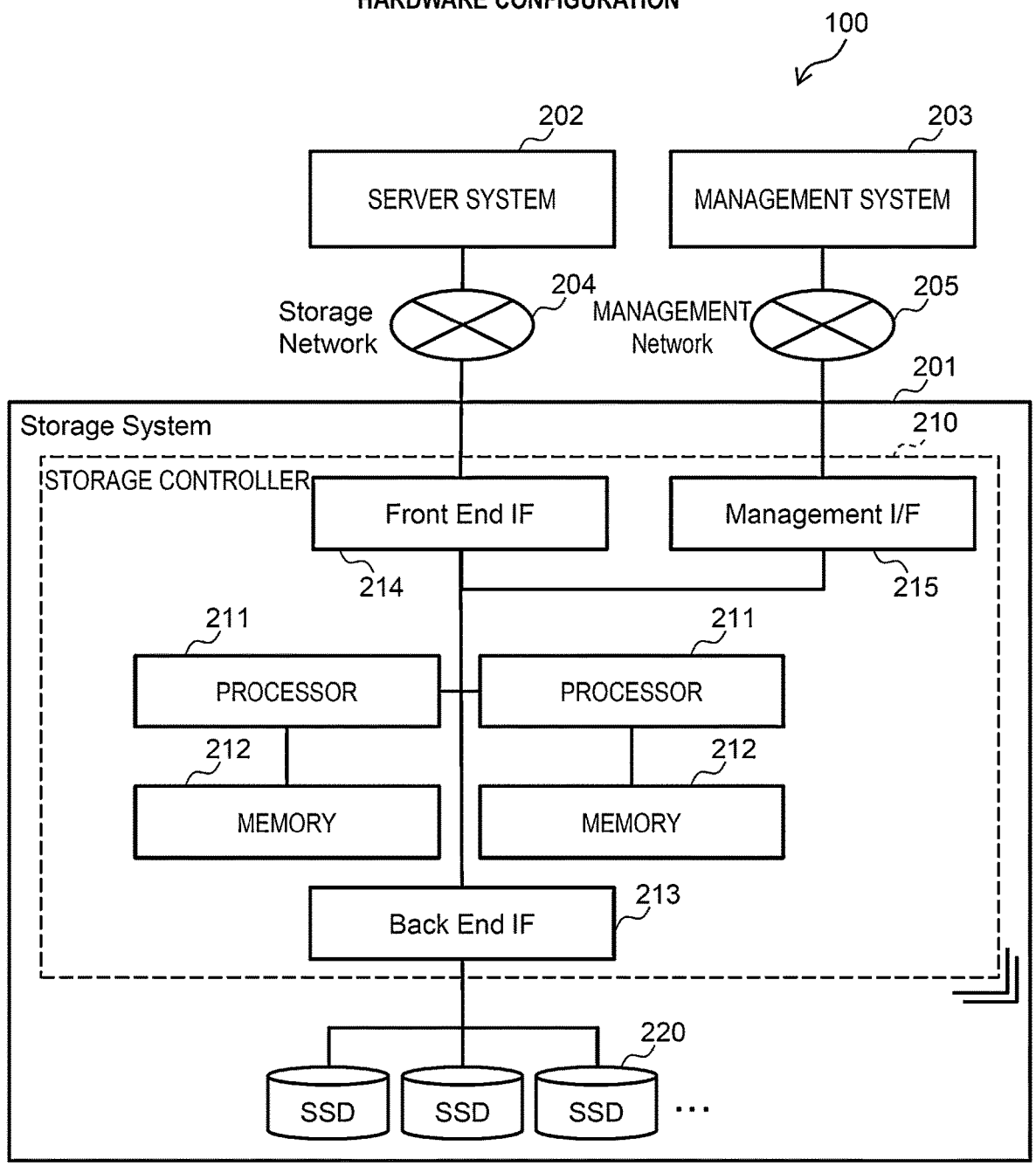
FIG. 1 is a block diagram showing a hardware structure of a storage system according to the invention.

FIG. 1 shows a hardware structure of a computer system.

A computer system 100 includes a storage system 201, a server system 202, and a management system 203. The storage system 201 and the server system 202 are connected to each other via a storage network 204 using a fiber channel (FC) or the like. The storage system 201 and the management system 203 are connected to each other via a management network 205 using internet protocol (IP) or the like. The storage network 204 and the management network 205 may be the same communication network.

The storage system 201 includes a plurality of storage controllers 210 and a plurality of SSDs 220. The plurality of SSDs 220 are connected to the storage controllers 210. The plurality of SSDs 220 is an example of a persistent storage device. A pool 13 is formed based on the plurality of SSDs 220. Data stored in a page 14 of the pool 13 is stored in one or more SSDs 220.

The storage controller 210 includes CPUs 211, memories 212, a back end interface 213, a front end interface 214, and a management interface 215.

The CPU 211 executes a program stored in the memory 212.

The memory 212 stores the program executed by the CPU 211, data used by the CPU 211, or the like. A memory may be double as a set of the memory 212 and the CPU 211.

The back end interface 213, the front end interface 214, and the management interface 215 are examples of an interface device.

The back end interface 213 is a communication interface device that mediates data exchange between the SSD 220 and the storage controller 210. The plurality of SSDs 220 are connected to the back end interface 213.

The front end interface 214 is a communication interface device that mediates data exchange between the server system 202 and the storage controller 210. The server system 202 is connected to the front end interface 214 via the storage network 204.

The management interface 215 is a communication interface device that mediates data exchange between the management system 203 and the storage controller 210. The management system 203 is connected to the management interface 215 via the management network 205.

The server system 202 includes one or more host devices. The server system 202 transmits an I/O request (write request or read request) designating an I/O destination to the storage controller 210. The I/O destination is, for example, a logical volume number such as a logical unit number (LUN) or a logical address such as a logical block address (LBA).

The management system 203 includes one or more management devices. The management system 203 manages the storage system 201.

Figure 2:
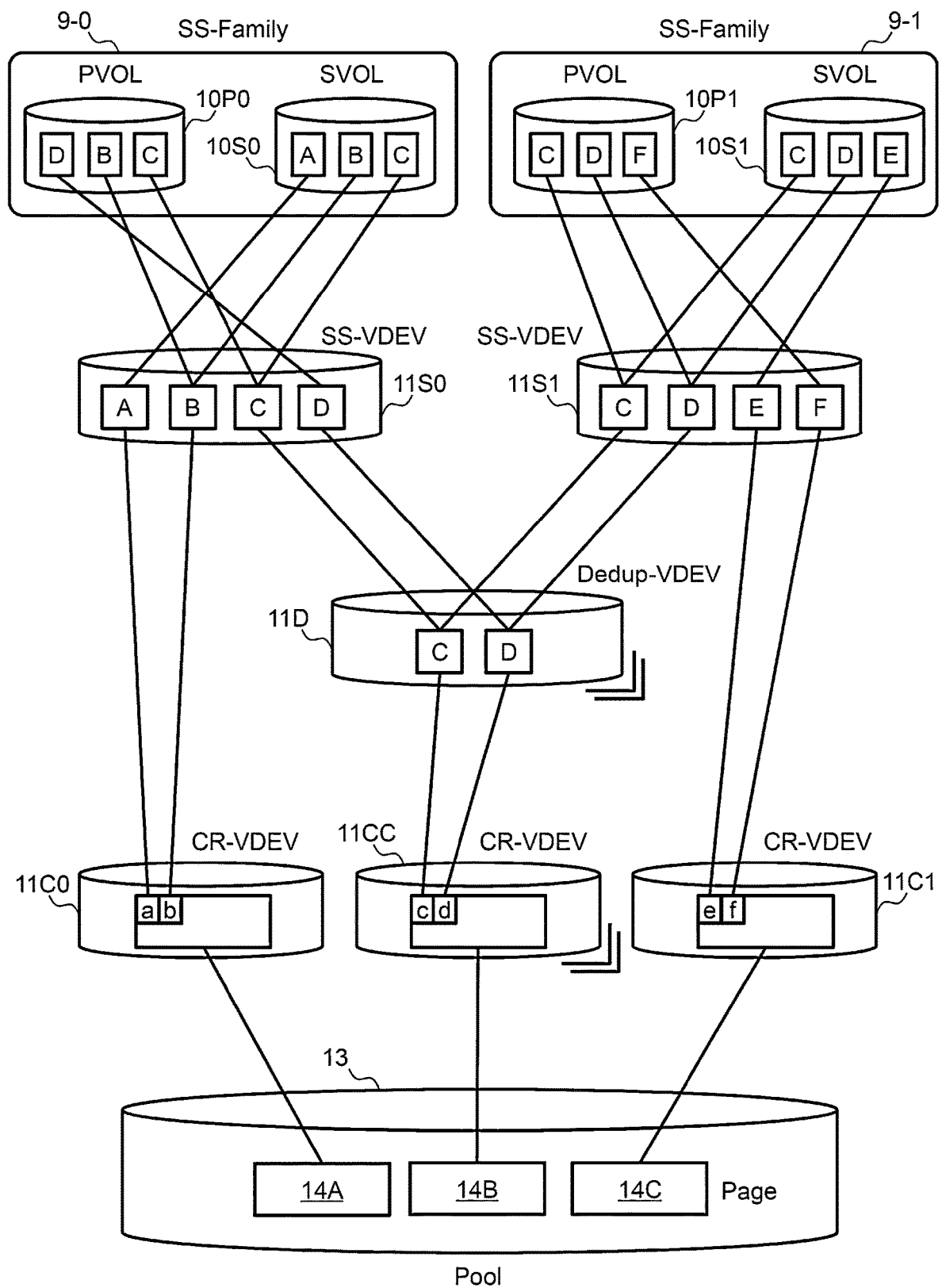
FIG. 2 is a schematic diagram of storage control of the storage system according to the invention.

FIG. 2 shows an outline of storage control of a storage system. In FIG. 2, data (data A, B, C, . . . ) in the alphabetical uppercase character notation is block data, and data (data a, b, c, . . . ) in the alphabetical lowercase character notation is sub-block data. The block data may be data in units of blocks. The block may be a fixed-length logical storage area (logical address range). The sub-block data is compressed data of the block data, and is data whose storage destination is a sub-block group (one or more sub-blocks). The sub-block may be a logical storage area having a size smaller than that of the block. For example, an integer multiple of the sub-block may be a block.

A storage system including a storage device and a processor includes a snapshot family (SS-Family) 9, a snapshot virtual device (SS-VDEV) 11S, a deduplication virtual device (Dedup-VDEV) 11D, a compression rewrite virtual device (CR-VDEV) 11C, and the pool 13.

The SS-Family 9 is a VOL group including a PVOL 10P and an SVOL 10S which is a snapshot of the PVOL 10P.

The SS-VDEV 11S is a virtual device as a logical address space, and is a storage destination for data whose storage destination is any VOL 10 in the SS-Family 9.

The Dedup-VDEV 11D is a virtual device as a logical address space different from the SS-VDEV 11S, and is a storage destination for duplicate data of two or more SS-VDEVs 11S.

The CR-VDEV 11C is a virtual device as a logical address space different from the SS-VDEV 11S and the Dedup-VDEV 11D, and is a storage destination for compressed data.

Each of a plurality of CR-VDEVs 11C is associated with one of the SS-VDEV 11S and the Dedup-VDEV 11D, and is not associated with both the VDEVs 11S and 11D. That is, each CR-VDEV 11C is a storage destination for data whose storage destination is a VDEV (virtual device) corresponding to the CR-VDEV 11C, and is not a storage destination for data whose storage destination is a VDEV not corresponding to the CR-VDEV 11C. The compressed data whose storage destination is the CR-VDEV 11C is stored in the pool 13.

The pool 13 is a logical address space based on at least a part of the storage device (for example, persistent storage device) provided in the storage system. The pool 13 may be based on at least a part of external storage device (for example, persistent storage device) of the storage system, instead of or in addition to at least a part of the storage devices provided in the storage system. The pool 13 includes a plurality of pages 14 which are a plurality of logical areas. The compressed data whose storage destination is the CR-VDEV 11C is stored in the page 14 in the pool 13. Mapping between an address in the CR-VDEV 11C and an address in the pool 13 is 1:1. The pool 13 is formed of one or more pool VOLs.

According to the example shown in FIG. 2, the following storage control is performed.

The processor creates an SVOL 10S0 as a snapshot of a PVOL 10P0, and accordingly, an SS-Family 9-0 using the PVOL 10P0 as the root VOL can be created. The processor creates an SVOL 10S1 as a snapshot of a PVOL 10P1, and accordingly, an SS-Family 9-1 using the PVOL 10P1 as the root VOL can be created. According to FIG. 2, examples of a plurality of SS-families include the SS-Families 9-0 and 9-1.

The storage system includes one or more SS-VDEVs 11S for the plurality of SS-Families 9. For each SS-Family 9, for data whose storage destination is any VOL 10 in the SS-Family 9, the SS-VDEV 11S corresponding to the SS-Family 9 among a plurality of SS-VDEVs 11S is set as the storage destination. For example, the SS-Family 9-0 is specifically as follows.

The processor sets the SS-VDEV 11S0 as a storage destination for the data A whose storage destination is the SVOL 10S0 of the SS-Family 9-0. The processor maps an address corresponding to the data A in the SVOL 10S0 to an address corresponding to the data A in the SS-VDEV 11S0 corresponding to the SS-Family 9-0.

When the same data B is present in a plurality of VOLS (PVOL 10P0 and SVOL 10S0) of the SS-Family 9-0, the processor maps a plurality of addresses (an address in the PVOL 10P0 and an address in the SVOL 10S0) of the same data B among the plurality of VOLs 10 to an address (an address corresponding to the data B) of the SS-VDEV 11S0 of the SS-Family 9-0.

For each of the SS-Families 9-0 and 9-1 (an example of two or more SS-Families 9), a storage destination for non-duplicate data is the CR-VDEV 11C corresponding to the SS-Family 9, and the storage destination for the duplicate data is the Dedup-VDEV 11D.

That is, since data C is duplicated with the SS-VDEVs 11S0 and 11S1 (an example of two or more SS-VDEVs 11S) of the SS-Families 9-0 and 9-1, the processor maps two addresses of the duplicate data C of the SS-VDEVs 11S0 and 11S1 to an address corresponding to the duplicate data C of the Dedup-VDEV 11D. Then, the processor compresses the duplicate data C, and sets a storage destination for compressed data c to a CR-VDEV 11CC corresponding to the Dedup-VDEV 11D. That is, the processor maps an address (block address) of the duplicate data C in the Dedup-VDEV 11D to an address (sub-block address) of the compressed data c in the CR-VDEV 11CC. In addition, the processor allocates a page 14B to the CR-VDEV 11CC, and stores the compressed data c in the page 14B. The address of the compressed data c in the CR-VDEV 11CC is mapped to an address in the page 14B of the pool 13.

On the other hand, for the SS-VDEV 11S0, since the data A is not duplicated with data in the other SS-VDEV 11S1, the processor compresses the non-duplicate data A, and sets compressed data a as a CR-VDEV 11C0 corresponding to the SS-VDEV 11S0. That is, the processor maps an address (block address) of the non-duplicate data A in the SS-VDEV 11S0 to an address (sub-block address) of the compressed data a in the CR-VDEV 11CC. In addition, the processor allocates a page 14A to the CR-VDEV 11C0, and stores the compressed data a in the page 14A. The address of the compressed data a in the CR-VDEV 11C0 is mapped to an address in the page 14A of the pool 13.

The CR-VDEV 11C is a rewritable VDEV. Therefore, the processor updates address mapping both when the CR-VDEV 11C corresponding to the SS-VDEV 11S is a storage destination for updated data and when the CR-VDEV 11C corresponding to the Dedup-VDEV 11D is the storage destination for the updated data. Specifically, the processor performs, for example, the following storage control.

When a storage target for the CR-VDEV 11C0 is updated data a' of the compressed data a, the processor sets a storage destination for the updated data a' as an empty address in the CR-VDEV 11C0, and invalidates the address of the compressed data a before update. The processor maps the address that has been mapped to the address of the compressed data a, that is, the address in the SS-VDEV 11S0 to a storage destination address of the updated data a' in the CR-VDEV 11C0 instead of the address of the compressed data a in the CR-VDEV 11C0. In addition, the processor maps the address that has been mapped to the address of the compressed data a, that is, the address in the page 14A to the storage destination address of the updated data a' in the CR-VDEV 11C0 instead of the address of the compressed data a in the CR-VDEV 11C0.

When a storage target for the CR-VDEV 11CC is updated data c' of the compressed data c, the processor sets a storage destination for the updated data c' as an empty address in the CR-VDEV 11CC, and invalidates the address of the compressed data c before update. The processor maps the address that has been mapped to the address of the compressed data c, that is, the address in the Dedup-VDEV 11D to a storage destination address of the updated data c' in the CR-VDEV 11CC instead of the address of the compressed data c in the CR-VDEV 11CC. In addition, the processor maps the address that has been mapped to the address of the compressed data c, that is, the address in the page 14B to the storage destination address of the updated data c' in the CR-VDEV 11CC instead of the address of the compressed data a in the CR-VDEV 11CC. In general, the above-described mapping is managed for each unit of a small-size such as 4 KB or 8 KB in order to increase the effect of reducing a data amount by a snapshot or deduplication.

The CR-VDEV 11C is the above-described rewritable VDEV, and garbage collection is performed. That is, by performing the garbage collection of the CR-VDEV 11C, the processor can make valid addresses (addresses of latest data) continuous and make addresses of empty areas continuous.

According to the example shown in FIG. 2, in addition to the SS-VDEV 11S which is the storage destination for the data in the SS-Family 9, the Dedup-VDEV 11D which is the storage destination for the duplicate data in two or more SS-Families 9 is prepared. Therefore, even when the address of the duplicate data C in the Dedup-VDEV 11D is changed, the address mapping to be changed is only two pieces of mapping (mapping for two addresses in the SS-VDEVs 11S0 and 11S1). On the other hand, in one comparative example, the storage destination for the data in the SS-Family 9 and the storage destination for the duplicate data in two or more SS-Families 9 are the same VDEV. In this case, address mapping to be changed for the duplicate data C is four pieces of mapping (mapping for four addresses in the VOLs 10P0, 10S0, 10P1, and 10S1). In the embodiment, it is expected to change the address mapping in a time shorter than in the comparative example.

In addition to the Dedup-VDEV 11D, the CR-VDEV 11CC is prepared for the Dedup-VDEV 11D. Therefore, even when the address of the compressed data c in the CR-VDEV 11CC is changed, the address mapping to be changed is only one piece of mapping (mapping for one address in the Dedup-VDEV 11D). On the other hand, in one comparative example, the storage destination for the compressed data of the data in the SS-Family 9 and the storage destination for the compressed data of the duplicate data in two or more SS-Families 9 are the same VDEV. In this case, address mapping to be changed for the compressed data c of the duplicate data C is four pieces of mapping (mapping for four addresses in the VOLs 10P0, 10S0, 10P1, and 10S1). In the embodiment, it is expected to change the address mapping in a time shorter than in the comparative example.

The address of the compressed data c is changed in the garbage collection of the CR-VDEV 11CC corresponding to the Dedup-VDEV 11D. For example, in the garbage collection of the CR-VDEV 11CC, the processor changes the address of the updated data c' (the updated data of the compressed data c) in the CR-VDEV 11CC, and maps the address, which is mapped to the address before the change, that is, the address in the Dedup-VDEV 11D to the address after the change in the CR-VDEV 11CC. Since it is expected to change the address mapping for the compressed data of the duplicate data in a short time, it is expected to perform the garbage collection in a short time. The garbage collection of the CR-VDEV 11C corresponding to the SS-VDEV 11S includes, for example, the following processing. That is, the processor changes the address of the updated data a' (the updated data of the compressed data a) in the CR-VDEV 11C0, and maps the address, which is mapped to the address before the change, that is, the address in the SS-VDEV 11S0 to the address after the change in the CR-VDEV 11C0.

For at least one CR-VDEV 11C, the rewritable VDEV in which uncompressed data is stored may be adopted instead of the CR-VDEV 11C, but in the embodiment, the CR-VDEV 11C is adopted as the rewritable VDEV. Therefore, the data finally stored in the storage device is compressed data, and accordingly, a storage capacity to be consumed can be reduced.

Figure 3:
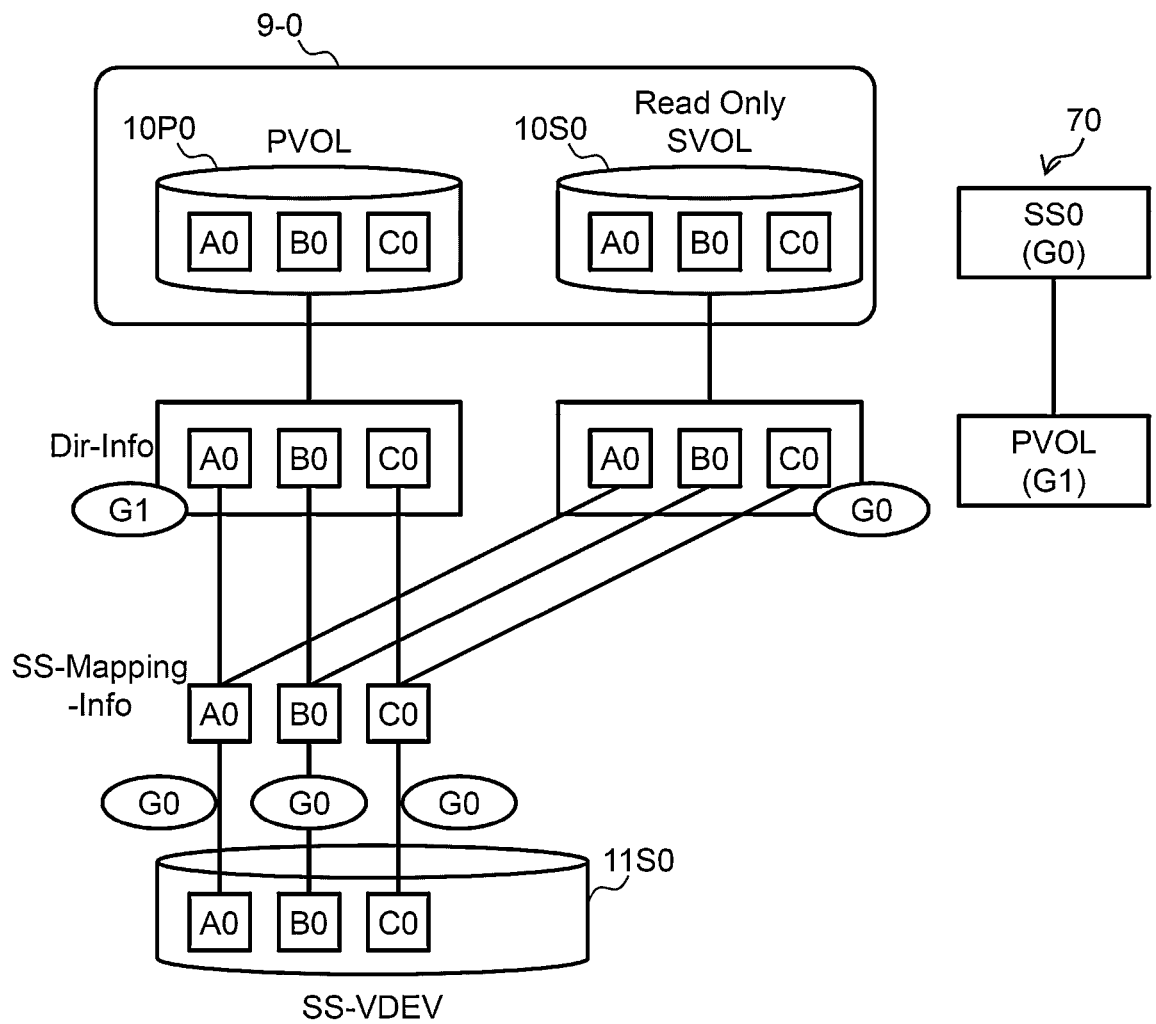
FIG. 3 is a schematic diagram of management of mapping between an address in an SS-Family and an address in an SS-VDEV.

FIG. 3 shows an outline of management of the mapping between the address in the SS-Family 9 and the address in the SS-VDEV 11S. In the drawing, "GX" (X is an integer of 0 or more) means a generation X. FIG. 3 takes the SS-Family 9-0 and the SS-VDEV 11S0 as examples.

The processor can manage mapping between an address in the VOL 10 in the SS-Family 9-0 and the address in the SS-VDEV 11S0 using meta information. The meta information includes directory information (Dir-Info) and snapshot mapping information (SS-Mapping-Info). The processor manages data of the PVOL 10P0 and the SVOL 10S0 by associating the Dir-Info with the SS-Mapping-Info. For the data whose storage destination is the VOL 10, the Dir-Info includes information indicating an address of a reference source (the address in the VOL 10), and the SS-Mapping-Info corresponding to the data includes information indicating an address of a reference destination (the address in the SS-VDEV 11S0).

Further, the processor manages a time series of the PVOL 10P0 and the SVOL 10S0 based on generation information associated with the Dir-Info, and manages the generation information indicating a generation, in which the data is created, in association with the SS-Mapping-Info for each piece of data whose storage destination is the SS-VDEV 11S0. In addition, the processor manages latest generation information at this time as a latest generation.

In a stage before acquiring a snapshot, there are data A0, B0, and C0 whose storage destination is the PVOL 10P0. The latest generation is "0".

The Dir-Info associated with the PVOL 10P0 is associated with "0" as a generation # (a number indicating a generation), and includes reference information indicating a reference destination for all the data A0, B0, and C0 of the PVOL 10P0. Hereinafter, when the generation # associated with the Dir-Info is "X", it can be expressed that the Dir-Info is the generation X.

The SS-VDEV 11S0 is the storage destination for the data A0, B0, and C0, and the SS-Mapping-Info is associated with the data A0, B0, and C0. Each piece of SS-Mapping-Info is associated with "0" as the generation #. When the generation # associated with the SS-Mapping-Info represents "X", data corresponding to the SS-Mapping-Info can be expressed as data of the generation X.

In a state before acquiring a snapshot, for each piece of the data A0, B0, and C0, the information in the Dir-Info refers to the SS-Mapping-Info corresponding to the data. By associating the Dir-Info with the SS-Mapping-Info in this manner, it is possible to associate the PVOL 10P0 with the SS-VDEV 11S0 and implement data processing on the PVOL 10P0.

In order to acquire a snapshot, the processor sets duplication of the Dir-Info as Dir-Info of the read-only SVOL 10S0. Then, the processor increments a generation of Dir-Info of the PVOL 10P0, and also increments the latest generation. As a result, for each piece of the data A0, B0, and C0, the SS-Mapping-Info is referred to from both Dir-Info of a generation 0 and Dir-Info of a generation 1.

In this manner, a snapshot can be created by duplicating the Dir-Info, and the snapshot can be created without increasing the data on the SS-VDEV 11S0 and the SS-Mapping-Info.

Here, when the snapshot shot is acquired, the snapshot (SVOL 10S0), in which writing is prohibited at the time of acquisition and the data is fixed, becomes the generation 0, and the PVOL 10P0, in which the data can be written even after the acquisition, becomes the generation 1. The generation 0 is a "generation older by one generation in a direct line" with respect to the generation 1, and is referred to as a "parent" for convenience. Similarly, the generation 1 is a "generation newer by one generation in a direct line" with respect to the generation 0, and is referred to as a "child" for convenience. The storage system manages a parent-child relationship between generations as a Dir-Info generation management tree 70. A generation # of the Dir-Info is the same as a generation # of the VOL 10 corresponding to the Dir-Info. A generation # of the SS-Mapping-Info is the oldest generation # among one or more generations # of the Dir-Info referring to the SS-Mapping-Info.

Figure 4:
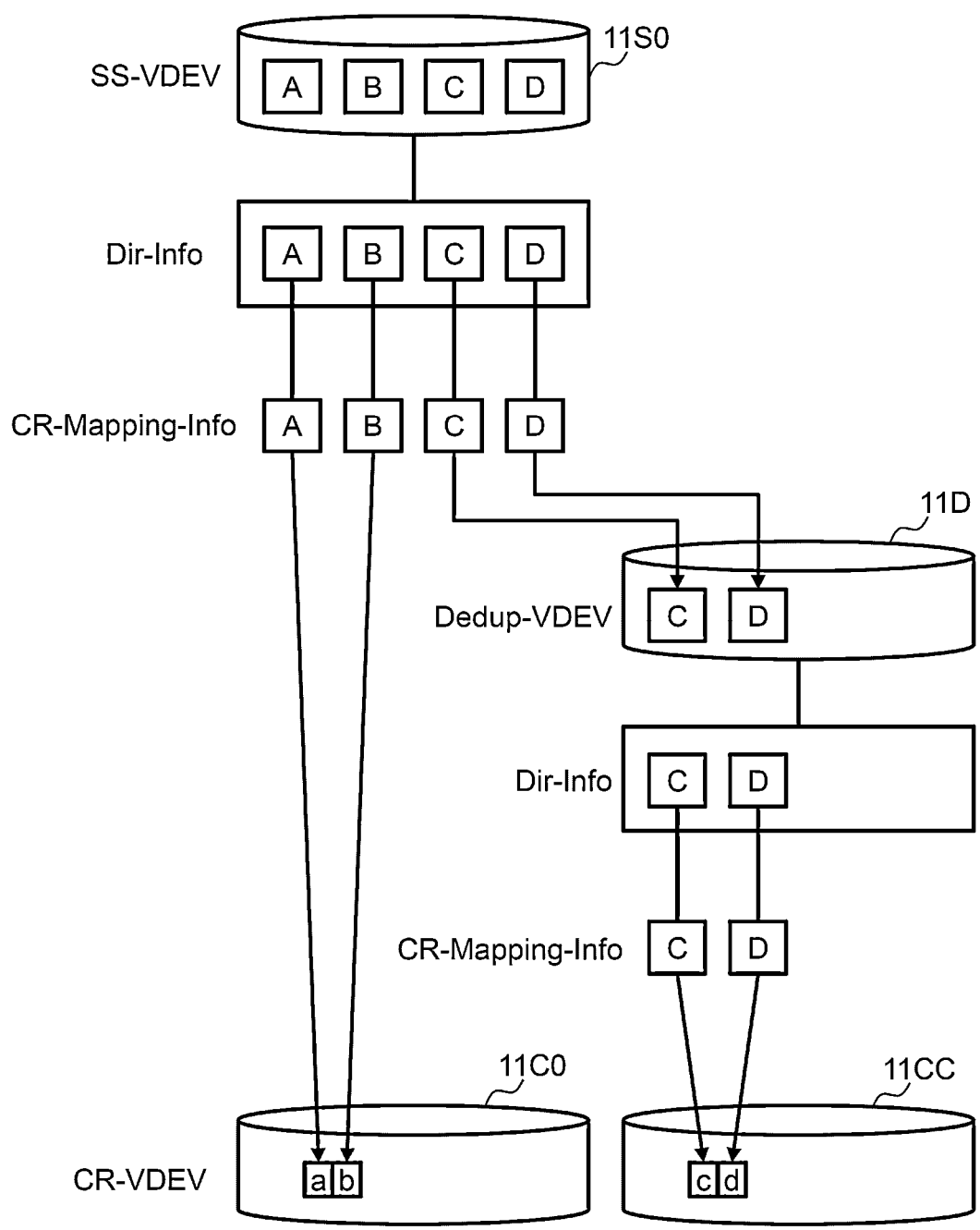
FIG. 4 is a schematic diagram of management of mapping between the address in the SS-VDEV and an address in a Dedup-VDEV, management of mapping between the address in the SS-VDEV and an address in a CR-VDEV, and management of mapping between the address in the Dedup-VDEV and the address in the CR-VDEV.

FIG. 4 shows an outline of management of mapping between the address in the SS-VDEV 11S and the address in the Dedup-VDEV 11D, management of mapping between the address in the SS-VDEV 11S and the address in the CR-VDEV 11C, and management of mapping between the address in the Dedup-VDEV 11D and the address in the CR-VDEV 11C. FIG. 4 takes the SS-VDEV 11S0 and the CR-VDEVs 11C0 and 11CC as examples.

The processor can manage, by using the meta information, mapping between the address in the SS-VDEV 11S0 and the address in the Dedup-VDEV 11D, mapping between the address in the SS-VDEV 11S0 and the address in the CR-VDEV 11C0, and mapping between the address in the Dedup-VDEV 11D and the address in the CR-VDEV 11CC. As described above, the meta information includes the Dir-Info CR-Mapping-Info. The processor manages data of the SS-VDEV 11S0 and the Dedup-VDEV 11D by associating the Dir-Info with the CR-Mapping-Info. For the data whose storage destination is the SS-VDEV 11S0, the Dir-Info includes information indicating an address of a reference source (the address in the SS-VDEV 11S0), and the CR-Mapping-Info corresponding to the data includes information indicating an address of a reference destination (the address in the CR-VDEV 11C0 or the address in the Dedup-VDEV 11D). For the data whose storage destination is the Dedup-VDEV 11D, the Dir-Info includes information indicating an address of a reference source (the address in the Dedup-VDEV 11D), and the CR-Mapping-Info corresponding to the data includes information indicating an address of a reference destination (the address in the CR-VDEV 11CC). The processor can specify the address in the SS-VDEV 11S or the Dedup-VDEV 11D from the address in the CR-VDEV 11C by referring to compression allocation information.

Although not shown in the drawing, in order to move valid data on the CR-VDEV and secure a continuous empty area, the storage system 201 holds a compression allocation management table 1011 in the memory 212 as information of reverse mapping from an address in a CR-VDEV to an address in an SS-VDEV or a Dedup-VDEV.

Figure 5:
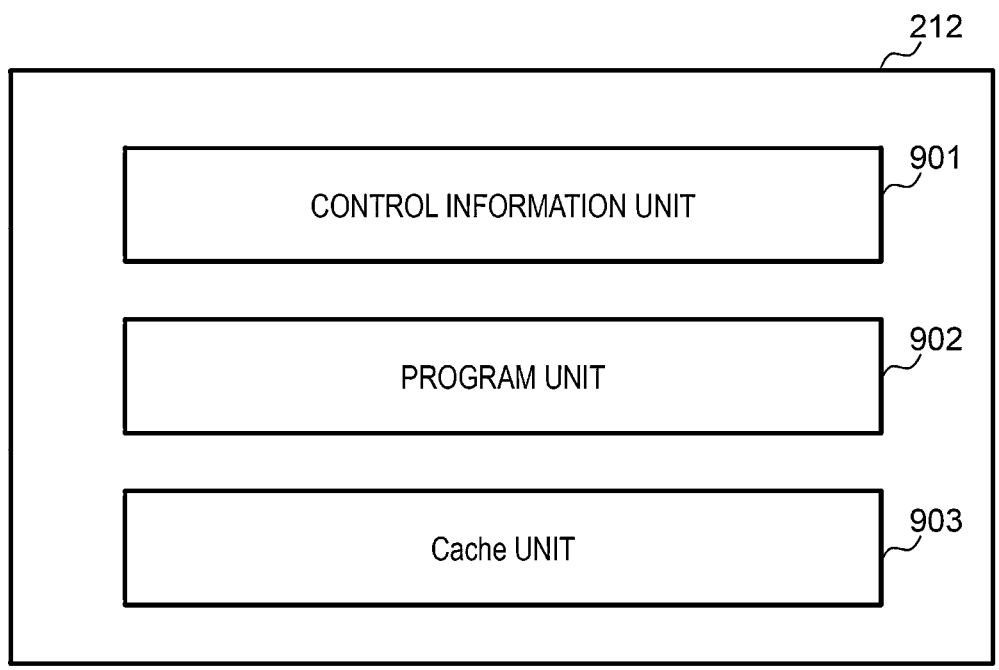
FIG. 5 is a diagram showing a configuration of a memory provided in a storage controller according to the invention.

FIG. 5 shows a configuration of the memory 212.

The memory 212 includes a control information unit 901 that stores control information (which may be referred to as management information), a program unit 902 that stores a program, and a cache unit 903 that temporarily stores data.

Figure 6:
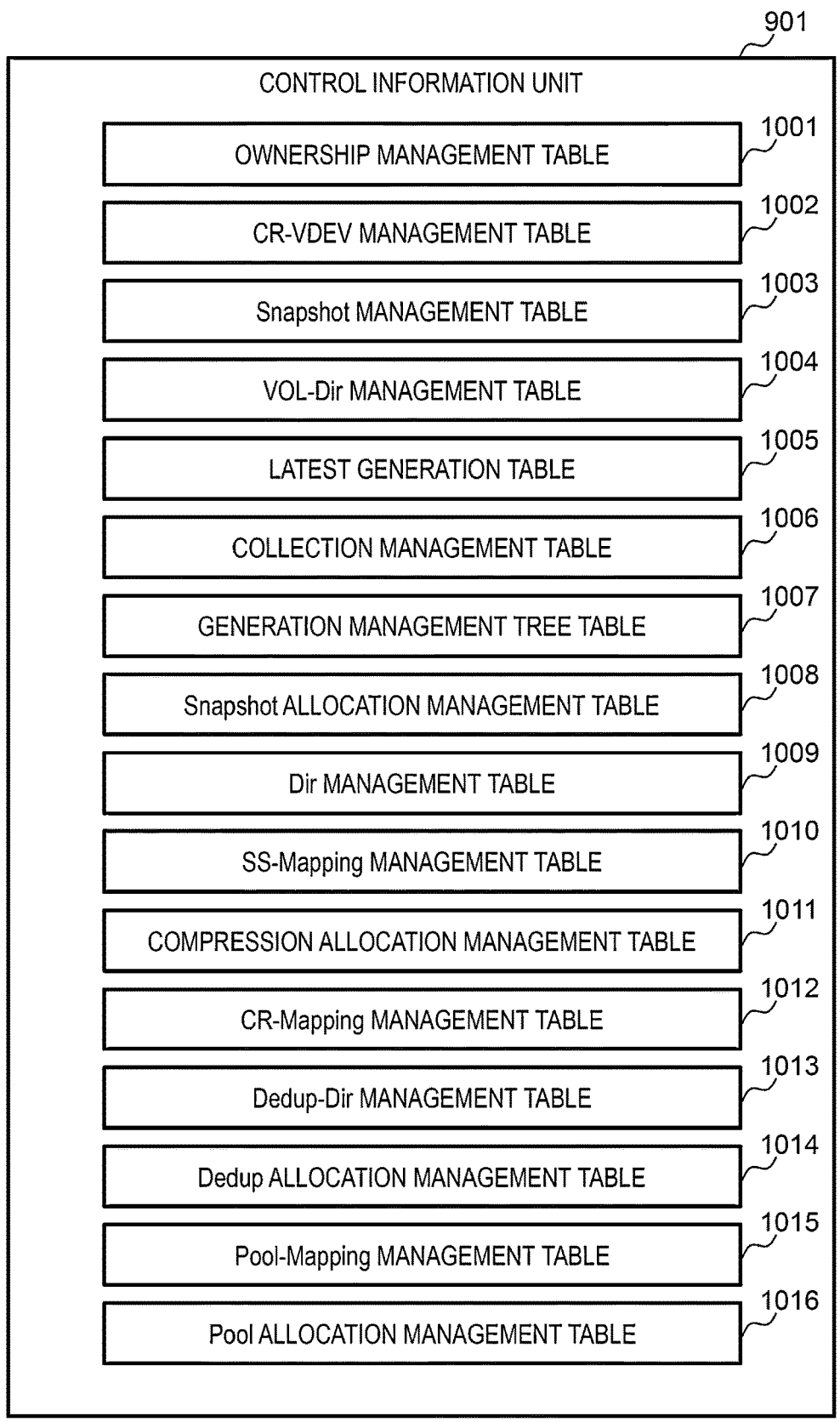
FIG. 6 is a diagram showing a configuration of a control information area in the memory of the storage controller according to the invention.

FIG. 6 shows the information stored in the control information unit 901.

The control information unit 901 stores an ownership management table 1001, a CR-VDEV management table 1002, a snapshot management table 1003, a VOL-Dir management table 1004, a latest generation table 1005, a collection management table 1006, a generation management tree table 1007, a snapshot allocation management table 1008, a Dir management table 1009, an SS-Mapping management table 1010, the compression allocation management table 1011, a CR-Mapping management table 1012, a Dedup-Dir management table 1013, a Dedup allocation management table 1014, a Pool-mapping management table 1015, and a Pool allocation management table 1016.

Figure 7:
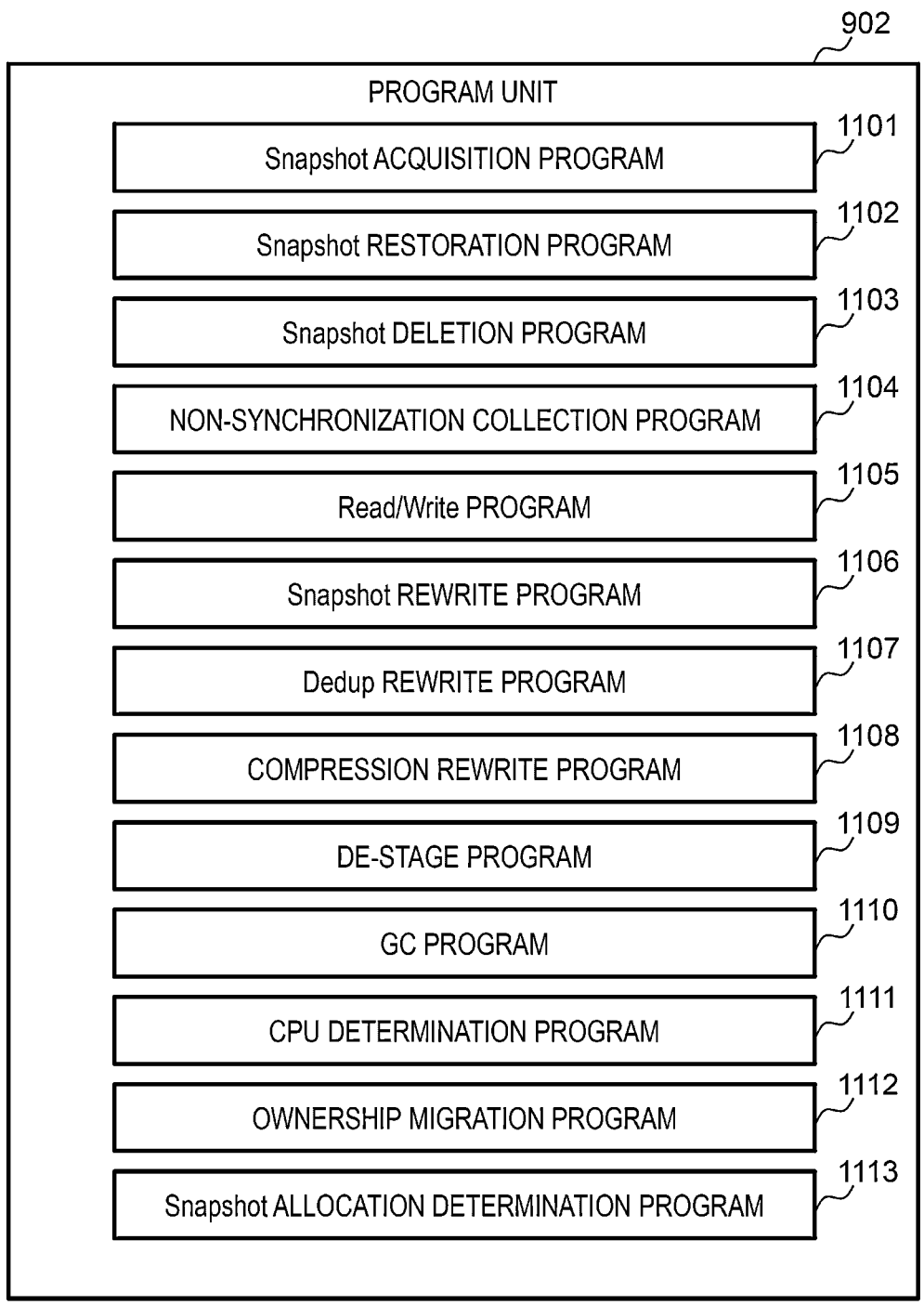
FIG. 7 is a diagram showing a configuration of a program area in the memory of the storage controller according to the invention.

FIG. 7 shows the program stored in the program unit 902.

The program unit 902 stores a snapshot acquisition program 1101, a snapshot restoration program 1102, a snapshot deletion program 1103, a non-synchronization collection program 1104, a read/write program 1105, a snapshot rewrite program 1106, a Dedup rewrite program 1107, a compression rewrite program 1108, a de-stage program 1109, a GC (garbage collection) program 1110, a CPU determination program 1111, an ownership migration program 1112, and a snapshot allocation determination program 1113.

FIG. 8 shows a configuration of the ownership management table 1001.

The ownership management table 1001 manages an ownership of the VOL 10 or a VDEV 11. For example, the ownership management table 1001 includes an entry for each VOL 10 and each VDEV 11. The entry includes information such as a VOL #/VDEV #1201 and an owner CPU #1202.

The VOL #/VDEV #1201 indicates an identification number of the VOL 10 or the VDEV 11. The owner CPU #1202 indicates an identification number of a CPU (a CPU having an ownership of the VOL 10 or the VDEV 11) serving as an owner CPU of the VOL 10 or the VDEV 11.

The owner CPU may be allocated in units of CPU groups or may be allocated in units of the storage controllers 210, instead of allocation in units of the CPUs 211.

FIG. 9 shows a configuration of the CR-VDEV management table 1002.

The CR-VDEV management table 1002 indicates the CR-VDEV 11C associated with the SS-VDEV 11S or the Dedup-VDEV 11D. For example, the CR-VDEV management table 1002 includes an entry for each SS-VDEV 11S and each Dedup-VDEV 11D. The entry includes information such as a VDEV #1301 and a CR-VDEV #1302.

The VDEV #1301 indicates an identification number of the SS-VDEV 11S or the Dedup-VDEV 11D. The CR-VDEV #1302 indicates an identification number of the CR-VDEV 11C.

FIG. 10 shows a configuration of the snapshot management table 1003.

The snapshot management table 1003 is present for each PVOL 10P (each SS-Family 9). The snapshot management table 1003 indicates an acquisition time of each snapshot (SVOL 10S). For example, the snapshot management table 1003 includes an entry for each SVOL 10S. The entry includes information such as a PVOL #1401, an SVOL #1402, and an acquisition time 1403.

The PVOL #1401 indicates an identification number of the PVOL 10P. The SVOL #1402 indicates an identification number of the SVOL 10S. The acquisition time 1403 indicates an acquisition time of the SVOL 10S.

FIG. 11 shows a configuration of the VOL-Dir management table 1004.

The VOL-Dir management table 1004 shows a correspondence relationship between the VOL and the Dir-Info. For example, the VOL-Dir management table 1004 includes an entry for each VOL 10. The entry includes information such as a VOL #1501, a Root-VOL #1502, and Dir-Info #1503.

The VOL #1501 indicates an identification number of the PVOL 10P or the SVOL 10S. The Root-VOL #1502 indicates an identification number of a Root-VOL. When the VOL 10 is the PVOL 10P, the Root-VOL is the PVOL 10P, and when the VOL 10 is the SVOL 10S, the Root-VOL is the PVOL 10P corresponding to the SVOL 10S. The Dir-Info

1503 indicates an identification number of the Dir-Info corresponding to the VOL 10.

FIG. 12 shows a configuration of the latest generation table 1005.

The latest generation table 1005 is present for each PVOL 10P (each SS-Family 9), and indicates a generation (generation #) of the PVOL 10P.

FIG. 13 shows a configuration of the collection management table 1006.

The collection management table 1006 may be, for example, a bitmap, and is present for each PVOL 10P (each SS-Family 9), in other words, is present for each Dir-Info generation management tree 70. The collection management table 1006 includes an entry for each piece of Dir-Info. The entry includes information such as Dir-Info #1701 and a collection request 1702.

The Dir-Info #1701 indicates an identification number of Dir-Info. The collection request 1702 indicates whether to request collection of the Dir-Info. "1" means that the collection is requested, and "0" means that the collection is not requested.

Figures 14, 15:
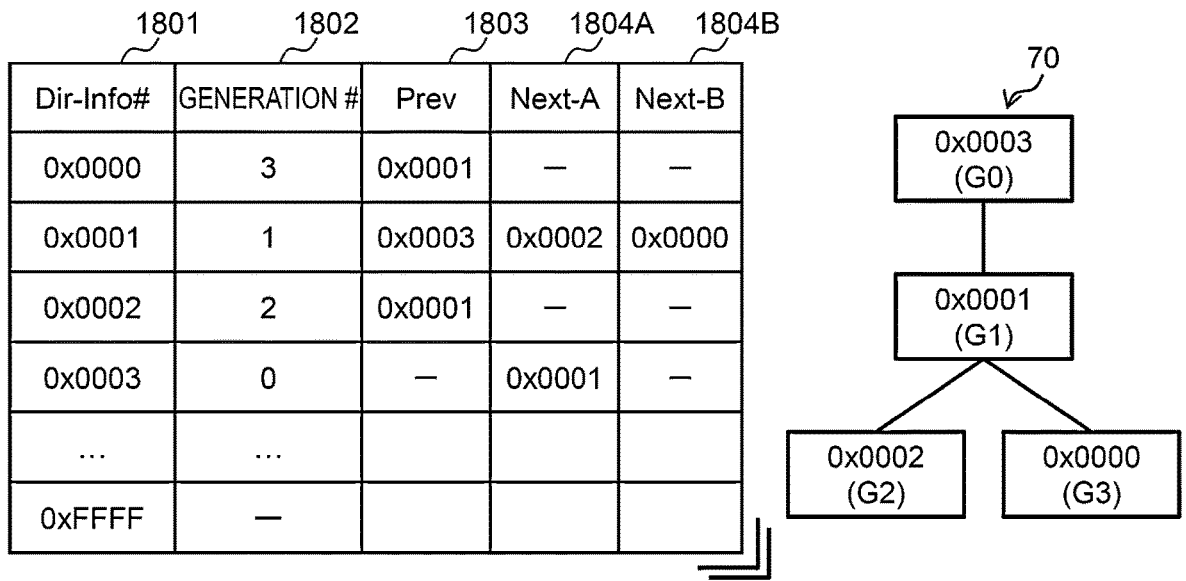
FIG. 14 shows a configuration of a generation management tree table.
FIG. 15 shows a configuration of a snapshot allocation management table.

FIG. 14 shows a configuration of the generation management tree table 1007.

The generation management tree table 1007 is present for each PVOL 10P (each SS-Family 9), in other words, is present for each Dir-Info generation management tree 70. The generation management tree table 1007 includes an entry for each piece of Dir-Info. The entry includes information such as Dir-Info #1801, a generation #1802, Prev 1803, and Next 1804.

The Dir-Info #1801 indicates an identification number of Dir-Info. The generation #1802 indicates a generation of the VOL 10 corresponding to the Dir-Info. The Prev 1803 indicates Dir-Info of a parent (one-higher-level) of the Dir-Info. The Next 1804 indicates Dir-Info of a child (one-lower-level) of the Dir-Info. The number of the Next 1804 may be the same as the number of the Dir-Info of the child. In FIG. 14, since there are two pieces of the Dir-Info of the child, there are two Next 1804 (Next-A 1804A and Next-B 1804B).

FIG. 15 shows a configuration of the snapshot allocation management table 1008.

The snapshot allocation management table 1008 is present for each SS-VDEV 11S, and indicates mapping from the address in the SS-VDEV 11S to the address in the VOL 10. The snapshot allocation management table 1008 includes an entry for each address in the SS-VDEV 11S. The entry includes information such as a block address 1901, a status 1902, an allocation destination VOL #1903, and an allocation destination address 1904.

The block address 1901 indicates an address of a block in the SS-VDEV 11S. The status 1902 indicates whether a block is allocated to an address of any VOL ("1" means allocated, and "0" means free). The allocation destination VOL #1903 indicates an identification number of the VOL 10 (PVOL 10P or SVOL 10S) including an address of a block allocation destination ("n/a" means non-allocated). The allocation destination address 1904 indicates an address (block address) of a block allocation destination ("n/a" means non-allocated).

FIG. 16 shows a configuration of the Dir management table 1009.

The Dir management table 1009 is present for each piece f Dir-Info, and indicates Mapping-Info of a reference destination for each piece of data (each piece of block data). For example, the Dir management table 1009 includes an entry for each address (block address). The entry includes information such as a VOL/VDEV address 2001 and reference destination Mapping-Info #2002.

The VOL/VDEV address 2001 indicates an address (block address) in the VOL 10 (PVOL 10P or SVOL 10S) or an address in the VDEV 11 (SS-VDEV 11S or Dedup-VDEV 11D). The reference destination Mapping-Info #2002 indicates an identification number of Mapping-Info of a reference destination.

FIG. 17 shows a configuration of the SS-Mapping management table 1010.

The SS-Mapping management table 1010 is present for each piece of Dir-Info of the VOL 10. The SS-Mapping management table 1010 includes an entry for each piece of SS-Mapping-Info corresponding to the Dir-Info of the VOL 10. The entry includes information such as Mapping-Info #2101, a reference destination address 2102, a reference destination SS-VDEV #2103, and a generation #2104.

The Mapping-Info #2101 indicates an identification number of SS-Mapping-Info. The reference destination address 2102 indicates an address referred to by the SS-Mapping-Info (address in the SS-VDEV 11S). The reference destination SS-VDEV #2103 indicates an identification number of the SS-VDEV 11S including the address referred to by the SS-Mapping-Info. The generation #2104 indicates a generation of data corresponding to the SS-Mapping-Info.

FIG. 18 shows a configuration of compression allocation management table 1011.

The compression allocation management table 1011 is present for each CR-VDEV 11C, and includes compression allocation information for each sub-block in the CR-VDEV 11C. The compression allocation management table 1011 includes an entry corresponding to the compression allocation information for each sub-block in the CR-VDEV 11C. The entry includes information such as a sub-block address 2201, a data length 2202, a status 2203, a head sub-block address 2204, an allocation destination VDEV #2205, and an allocation destination address 2206.

The sub-block address 2201 indicates an address of a sub-block. The data length 2202 indicates the number of sub-blocks constituting a sub-block group (one or more sub-blocks) in which compressed data is stored (for example, "2" means that the compressed data is present in two sub-blocks). The status 2203 indicates a status of a sub-block ("0" means free, "1" means allocated, and "2" means a GC (garbage collection) target). The head sub-block address 2204 indicates an address of a head sub-block among one or more sub-blocks (one or more sub-blocks in which the compressed data is stored) including the sub-block. The allocation destination VDEV #2205 indicates an identification number of the VDEV 11 (SS-VDEV 11S or Dedup-VDEV 11D) including a block of an allocation destination for the sub-block. The allocation destination address 2206 indicates an address of the block of the allocation destination for the sub-block (a block address in the SS-VDEV 11S or the Dedup-VDEV 11D).

FIG. 19 shows a configuration of the CR-Mapping management table 1012.

The CR-Mapping management table 1012 is present for each piece of Dir-Info of the Dedup-VDEV 11D and for each piece of Dir-Info of the SS-VDEV 11S. The CR-Mapping management table 1012 includes entries for each piece of CR-Mapping-Info corresponding to the Dir-Info of the Dedup-VDEV 11D and for each piece of CR-Mapping-Info corresponding to the Dir-Info of the SS-VDEV 11S. The entry includes information such as Mapping-Info #2301, a reference destination address 2302, a reference destination CR-VDEV #2303, and a data length 2304.

The Mapping-Info #2301 indicates an identification number of CR-Mapping-Info. The reference destination address 2302 indicates an address referred to by the CR-Mapping-Info (an address of a head sub-block in the sub-block group). The reference destination CR-VDEV #2303 indicates an identification number of the CR-VDEV 11C including the sub-block address referred to by the CR-Mapping-Info. The data length 2304 indicates the number of blocks referred to by the CR-Mapping-Info (blocks in the Dedup-VDEV 11D) or the number of sub-blocks constituting the sub-block group referred to by the CR-Mapping-Info.

FIG. 20 shows a configuration of the Dedup-Dir management table 1013.

The Dedup-Dir management table 1013 is present for each Dedup-VDEV 11D, and corresponds to Dedup-Dir-Info. The Dedup-Dir management table 1013 includes an entry for each address in the Dedup-VDEV 11D. The entry includes information such as a Dedup-VDEV address 2401 and reference destination allocation information #2402.

The Dedup-VDEV address 2401 indicates an address (block address) in the Dedup-VDEV 11D. The reference destination allocation information #2402 indicates an identification number of Dedup allocation information of a reference destination.

FIG. 21 shows a configuration of the Dedup allocation management table 1014.

The Dedup allocation management table 1014 is present for each Dedup-VDEV 11D (each piece of Dedup-Dir-Info), and indicates reverse reference mapping from Dedup allocation information corresponding to the address in the Dedup-VDEV 11D to the address in the SS-VDEV 11S. The Dedup allocation management table 1014 includes an entry for each piece of Dedup allocation information. The entry includes information such as allocation information #2501, an allocation destination SS-VDEV #2502, an allocation destination address 2503, and concatenated allocation information #2504.

The allocation information #2501 indicates an identification number of Dedup allocation information. The allocation destination SS-VDEV #2502 indicates an identification number of the SS-VDEV 11S including the address referred to by the Dedup allocation information. The allocation destination address 2503 indicates an address (a block address in the SS-VDEV 11S) referred to by the Dedup allocation information. The concatenated allocation information #2504 indicates an identification number of Dedup allocation information concatenated to the Dedup allocation information.

According to FIG. 21, Dedup allocation information # "3" is concatenated to Dedup allocation information # "1", and there is no Dedup allocation information concatenated to the Dedup allocation information # "3". Therefore, it is understood that duplicate data in a Dedup-VDEV address corresponding to the Dedup allocation information # "1" is duplicate data in the SS-VDEV 11S referred to by the Dedup allocation information # "1" and the SS-VDEV 11S referred to by the Dedup allocation information # "3". Since the number of pieces of duplicate data is indefinite, Dedup allocation information is concatenated according to the number of pieces of duplicate data. When the duplicate data is present in N SS-VDEVs 11S, sequential N pieces of Dedup allocation information are prepared.

FIG. 22 shows a configuration of the Pool-Mapping management table 1015.

The Pool-Mapping management table 1015 is present for each CR-VDEV 11C. The Pool-Mapping management table 1015 includes an entry for each area in page-size units in the CR-VDEV 11C. The entry includes information such as a VDEV address 2601 and a page #2602.

The VDEV address 2601 indicates a head address of an area (for example, a plurality of blocks) in page-size units. The page #2602 indicates an identification number of the allocated page 14 (for example, an address of the page 14 in the pool 13). When there are a plurality of pools 13, the page #2602 may include an identification number of the pool 13 including the page 14.

FIG. 23 shows a configuration of the Pool allocation management table 1016.

The Pool allocation management table 1016 is present for each pool 13, for example, when there are the plurality of pools 13. The Pool allocation management table 1016 shows a correspondence relationship between the page 14 and the area in the CR-VDEV 11C. The Pool allocation management table 1016 includes an entry for each page 14. The entry includes information such as a page #2701, RG #2702, a head address 2703, a status 2704, an allocation destination VDEV #2705, and an allocation destination address 2706.

The page #2701 indicates an identification number of the page 14. The RG #2702 indicates an identification number of a RAID group (in the embodiment, a RAID group configured with two or more SSDs 220) that is the basis of the page 14. The head address 2703 indicates a head address of the page 14. The status 2704 indicates a status of the page 14 ("1" means allocated, and "0" means free). The allocation destination VDEV #2705 indicates an identification number of the CR-VDEV 11C to which the page 14 is allocated ("n/a" means non-allocated). The allocation destination address 2706 indicates an allocation destination address of the page 14 (an address in the CR-VDEV 11C) ("n/a" means non-allocated).

Figure 24:
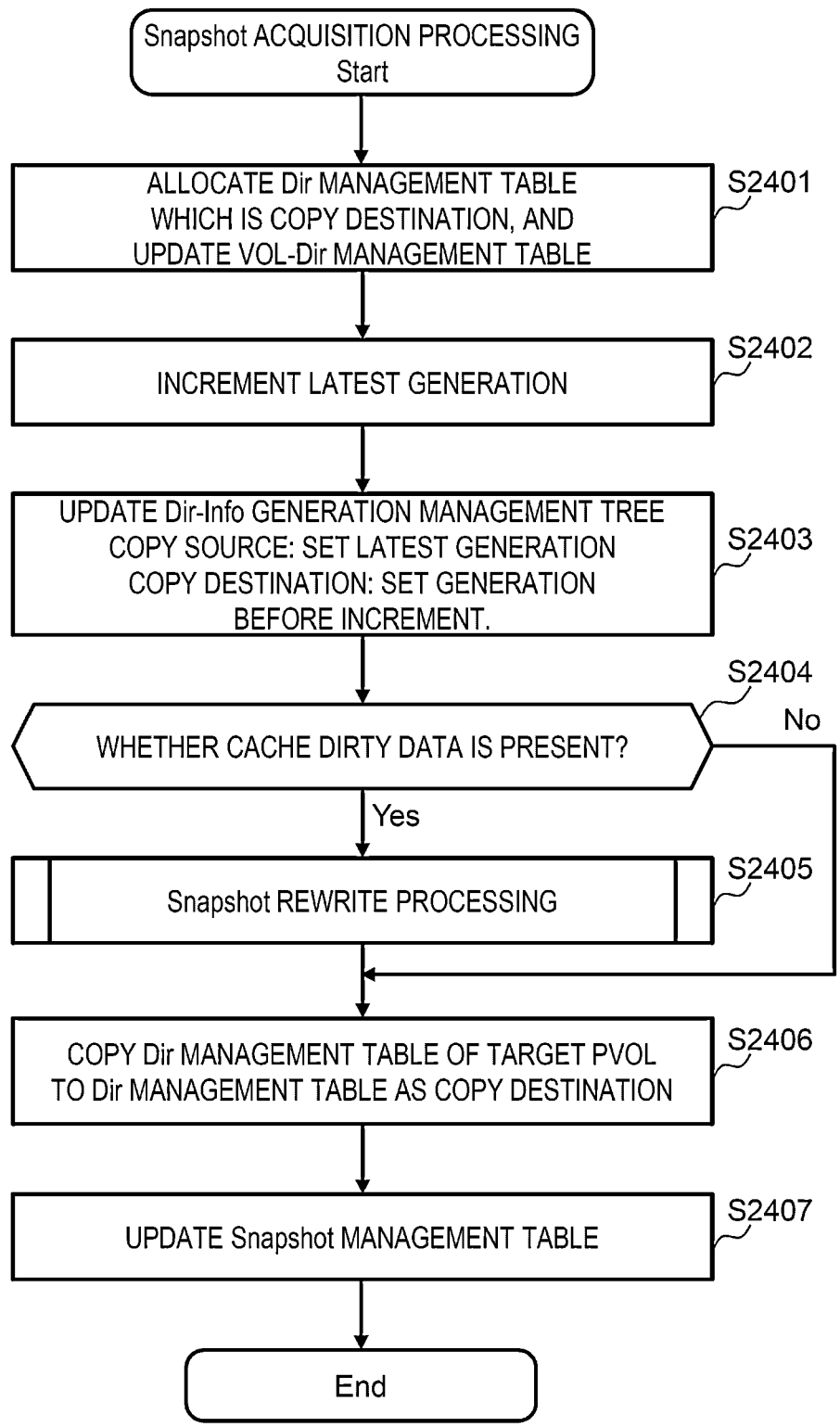
FIG. 24 shows a flow of snapshot acquisition processing.

FIG. 24 shows a flow of snapshot acquisition processing. The snapshot acquisition processing is executed by the snapshot acquisition program 1101 according to a snapshot acquisition instruction from the management system 203 (or another system such as the server system 202). In the snapshot acquisition instruction, for example, a target PVOL 10P is designated.

First, the snapshot acquisition program 1101 allocates the Dir management table 1009 which is a copy destination, and updates the VOL-Dir management table 1004 (S2401).

The snapshot acquisition program 1101 increments a latest generation # (S2402), and updates the generation management tree table 1007 (Dir-Info generation management tree 70) (S2403). At this time, the snapshot acquisition program 1101 sets the latest generation # in a copy source, and sets a generation # before the increment in the copy destination.

The snapshot acquisition program 1101 determines whether cache dirty data for the target PVOL 10P is present (S2404). The "cache dirty data" may be data that has not yet been written to the pool 13 among data stored in the cache unit 903.

When a determination result of S2404 is true (S2404: Yes), the snapshot acquisition program 1101 causes the snapshot rewrite program 1106 to execute snapshot rewrite processing (S2405).

When the determination result of S2404 is false (S2404: No), or after S2405, the snapshot acquisition program 1101 copies the Dir management table 1009 of the target PVOL 10P to the Dir management table 1009 as the copy destination (S2406).

Thereafter, the snapshot acquisition program 1101 updates the snapshot management table 1003 (S2407), and ends the processing. In S2407, an entry including the PVOL

1401 indicating the identification number of the target PVOL 10P, the SVOL #1402 indicating the identification number of the acquired snapshot (SVOL 10S), and the acquisition time 1403 indicating the acquisition time is added.

Figure 25:
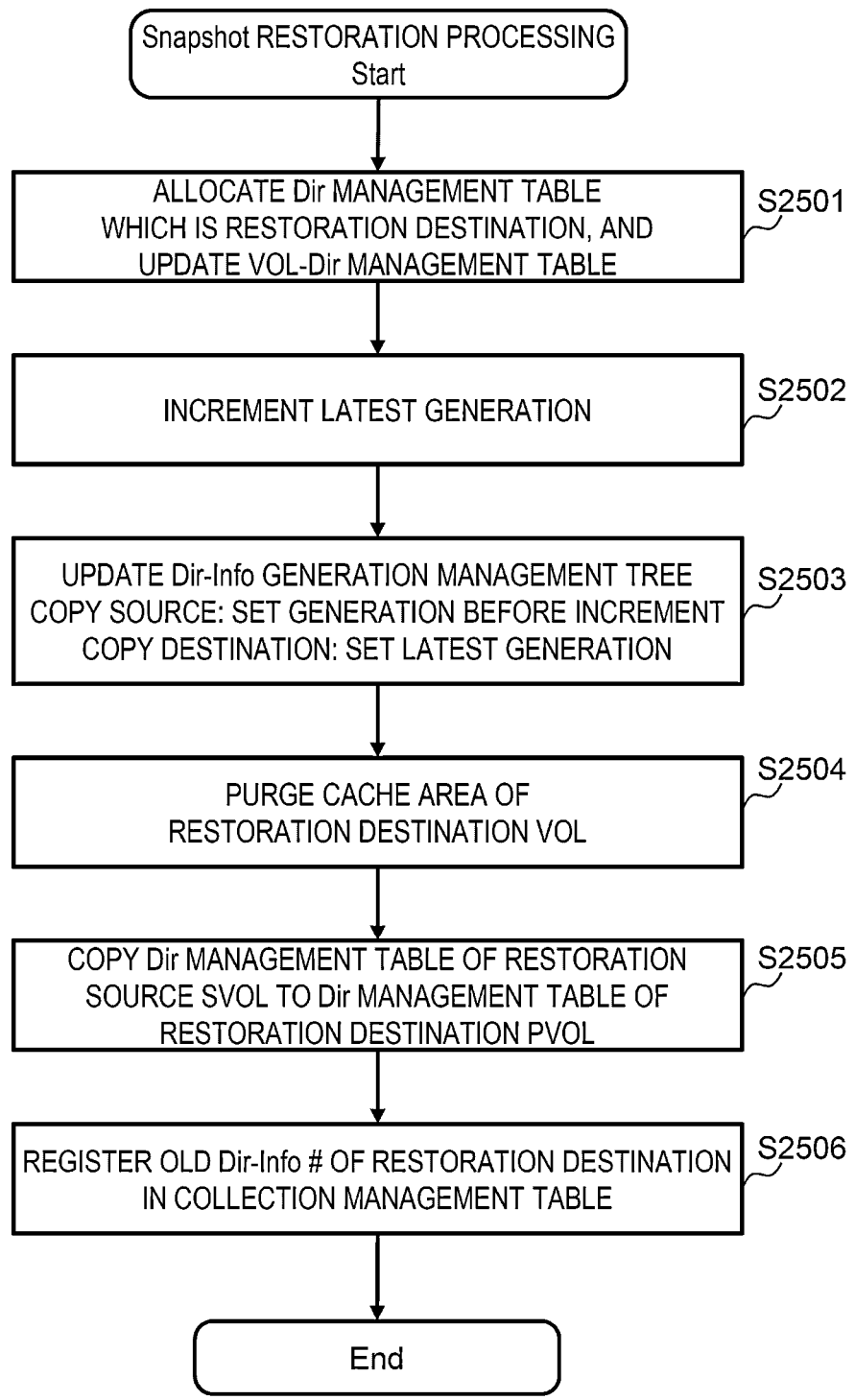
FIG. 25 shows a flow of snapshot restoration processing.

FIG. 25 shows a flow of snapshot restoration processing. The snapshot restoration processing is executed by the snapshot restoration program 1102 according to a restoration instruction from the management system 203 (or another system such as the server system 202). In the restoration instruction, for example, a restoration source SVOL and a restoration destination PVOL are designated.

First, the snapshot restoration program 1102 allocates the Dir management table 1009 which is a restoration destination, and updates the VOL-Dir management table 1004 (S2501).

The snapshot restoration program 1102 increments a latest generation # (S2502), and updates the generation management tree table 1007 (Dir-Info generation management tree 70) (S2503). At this time, the snapshot restoration program 1102 sets a generation # before the increment in the copy source, and sets the latest generation # in the copy destination.

The snapshot restoration program 1102 purges a cache area (an area in the cache unit 903) of the restoration destination PVOL (S2504).

The snapshot restoration program 1102 copies the Dir management table 1009 of the restoration source SVOL to the Dir management table 1009 of the restoration destination PVOL (S2505).

Thereafter, the snapshot restoration program 1102 registers Dir-Info # of old Dir-Info of a restoration destination in the collection management table 1006 (S2506), and ends the processing. In S2506, the collection request 1702 corresponding to the Dir-Info # is set to "1".

Figure 26:
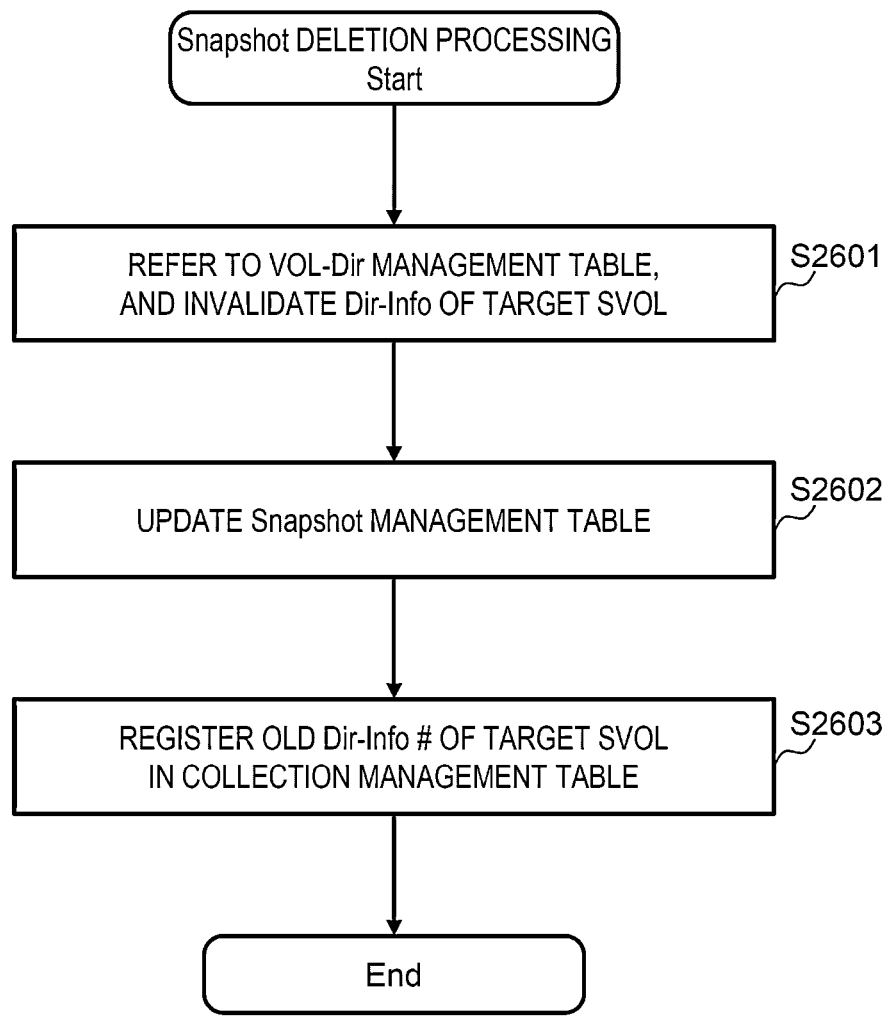
FIG. 26 shows a flow of snapshot deletion processing.

FIG. 26 shows a flow of snapshot deletion processing. The snapshot deletion processing is executed by the snapshot deletion program 1103 according to a snapshot deletion instruction from the management system 203 (or another system such as the server system 202). In the restoration instruction, for example, a target SVOL is designated.

First, the snapshot deletion program 1103 refers to the VOL-Dir management table 1004, and invalidates Dir-Info (the Dir-Info #1503) of the target SVOL (S2601).

Then, the snapshot deletion program 1103 updates the snapshot management table 1003 (S2602), registers old Dir-Info # of the target SVOL in the collection management table 1006 (S2603), and ends the processing. In S2603, the collection request 1702 corresponding to the Dir-Info # is set to "1".

Figure 27:
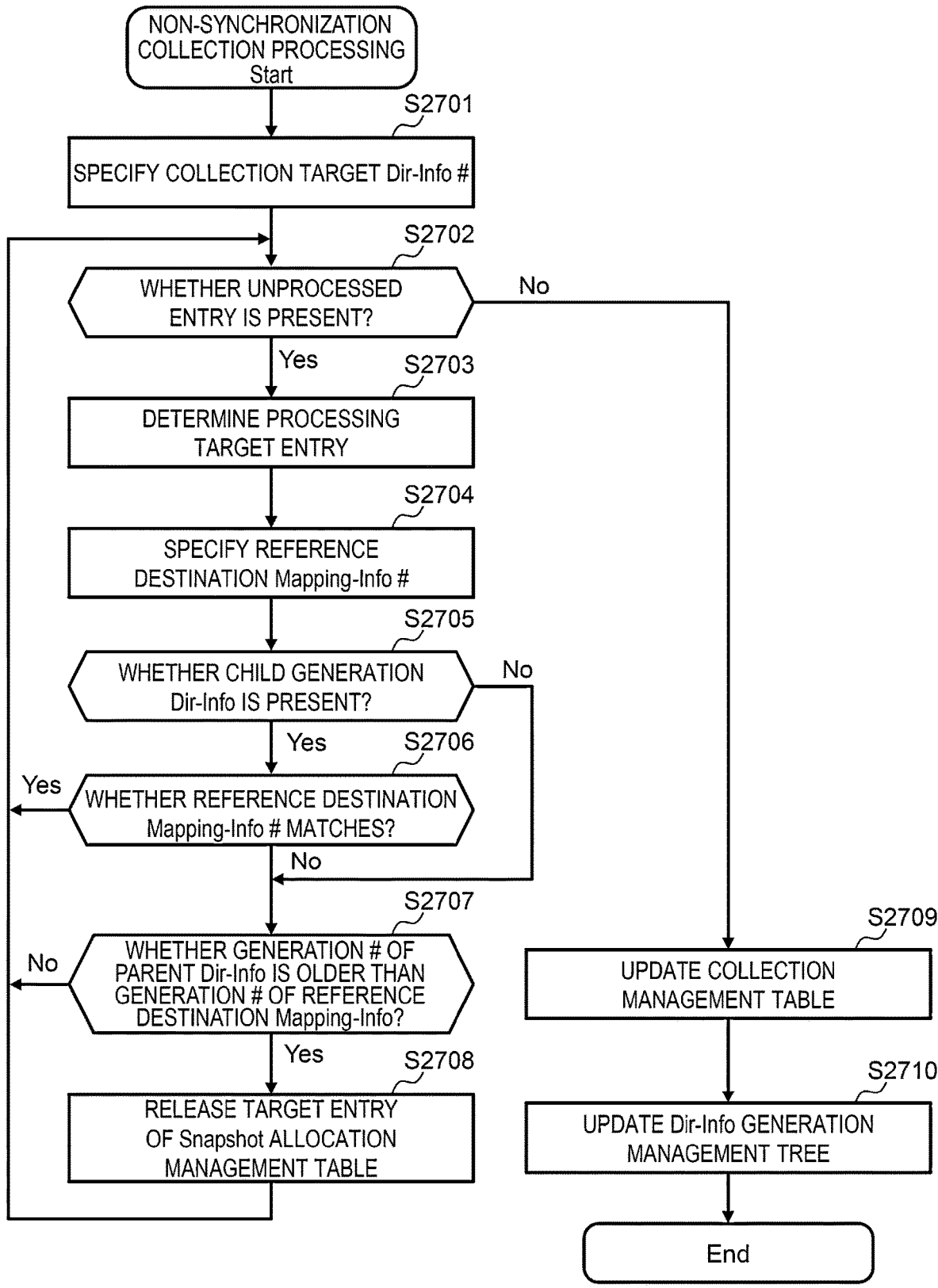
FIG. 27 shows a flow of non-synchronization collection processing.

FIG. 27 shows a flow of non-synchronization collection processing. The non-synchronization collection processing is executed, for example, periodically by the non-synchronization collection program 1104.

First, the non-synchronization collection program 1104 specifies collection target Dir-Info # from the collection management table 1006 (S2701). The "collection target Dir-Info #" is Dir-Info # whose collection request 1702 is "1". The non-synchronization collection program 1104 refers to the generation management tree table 1007, checks an entry of the collection target Dir-Info #, and does not select Dir-Info including two or more children.

Thereafter, the non-synchronization collection program 1104 determines whether an unprocessed entry is present (S2702). The "unprocessed entry" here is an entry, for which the non-synchronization collection processing is not processed, among entries for which the collection request 1702 is "1" in the collection management table 1006.

When a determination result of S2702 is true (S2702: Yes), the non-synchronization collection program 1104 determines a processing target entry (an entry including the collection request 1702 "1") from one or more unprocessed entries (S2703), and specifies the reference destination Mapping-Info #2002 from the Dir management table 1009 corresponding to target Dir-Info (Dir-Info identified from the Dir-Info #1701 in a processing target entry) (S2704).

The non-synchronization collection program 1104 refers to the generation management tree table 1007, and determines whether child generation Dir-Info of the target Dir-Info is present (S2705).

When a determination result of S2705 is true (S2705: Yes), the non-synchronization collection program 1104 specifies the reference destination Mapping-Info #2002 from the Dir management table 1009 corresponding to the child generation Dir-Info, and determines whether the reference destination Mapping-Info #2002 of the target Dir-Info matches the reference destination Mapping-Info #2002 of the child generation Dir-Info (S2706). When a determination result of S2706 is true (S2706: Yes), the processing returns to S2702.

When the determination result of S2706 is false (S2706: No) or when the determination result of S2705 is false (S2705: No), the non-synchronization collection program 1104 determines whether a generation # of parent generation Dir-Info of the target Dir-Info is older than the generation #2104 (see FIG. 21) of the reference destination Mapping-Info of the target Dir-Info (S2707). When a determination result of S2707 is false (S2707: No), the processing returns to S2702.

When the determination result of S2707 is true (S2707: Yes), the non-synchronization collection program 1104 initializes a target entry of the SS-Mapping management table 1010, and releases a target entry of the snapshot allocation management table 1008 (S2708). Thereafter, the processing returns to S2702. The release in S2708 corresponds to the release of blocks in the SS-VDEV.

When the determination result of S2702 is false (S2702: No), the non-synchronization collection program 1104 updates the collection management table 1006 (S2709), updates the generation management tree table 1007 (Dir-Info generation management tree 70) (S2710), and ends the processing.

Figure 28:
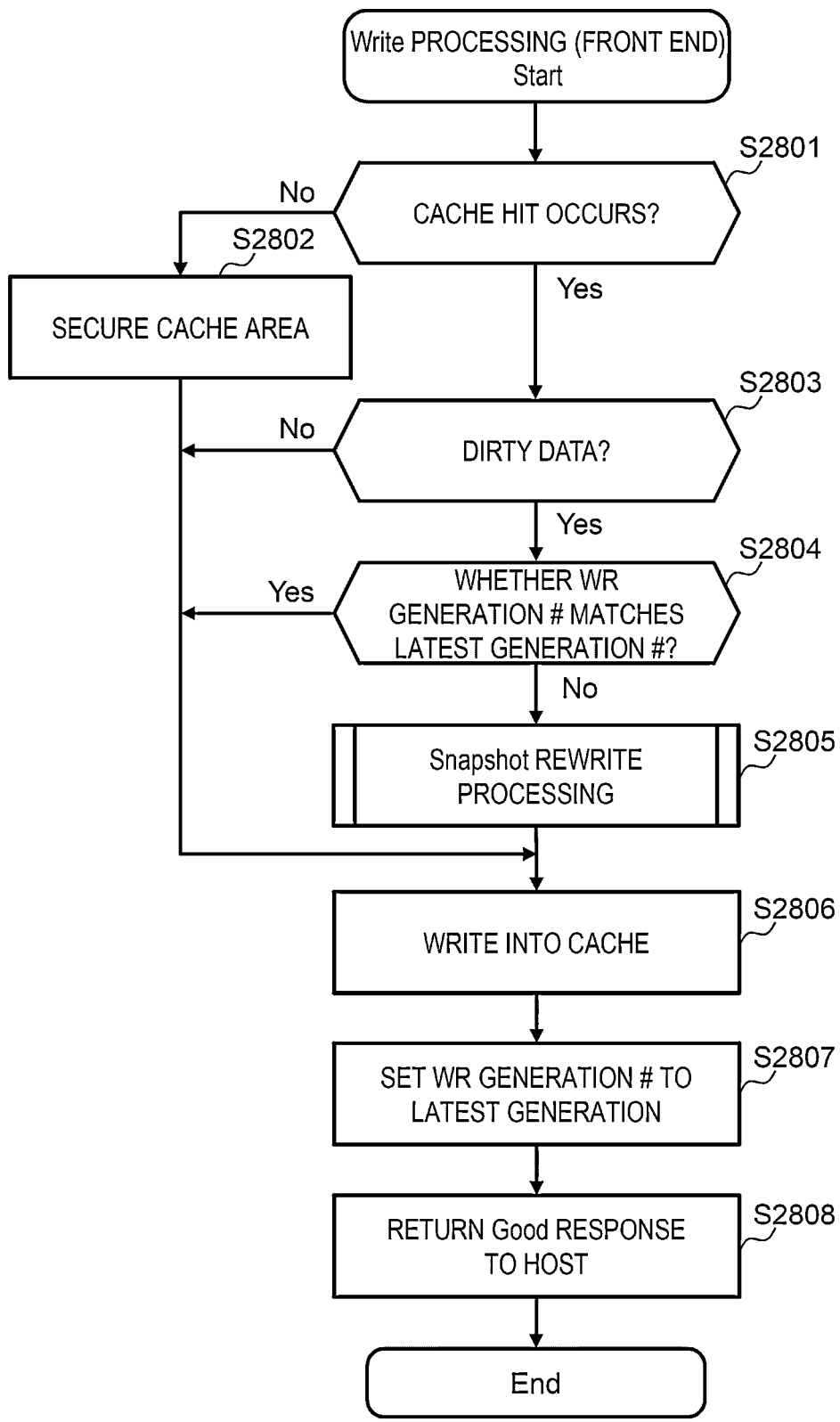
FIG. 28 shows a flow of write processing (front end).

FIG. 28 shows a flow of write processing (front end). The write processing (front end) is executed by the read/write program 1105 when a write request is received from the server system 202.

First, the read/write program 1105 determines whether a cache hit occurs in target data of the write request (S2801). The "cache hit" means that a cache area corresponding to a write destination VOL address (a VOL address designated in the write request) of the target data has already been secured. When a determination result of S2801 is false (S2801: No), the read/write program 1105 secures the cache area corresponding to the write destination VOL address of the target data from the cache unit 903 (S2802). Thereafter, the processing proceeds to S2806.

When the determination result of S2801 is true (S2801: Yes), the read/write program 1105 determines whether the data in which the cache hit occurs (the data in the secured cache area) is dirty data (data not reflected (not written) in the pool 13) (S2803). When a determination result of S2803 is false (S2803: No), the processing proceeds to S2806.

When the determination result of S2803 is true (S2803: Yes), the read/write program 1105 determines whether a WR (Write) generation # of the dirty data matches a generation # of the target data of the write request (S2804). The "WR generation #" is held in, for example, cache data management information (not shown). The generation # of the target data of the write request is acquired from a latest generation #403. S2804 is processing for preventing the dirty data from being updated with the target data of the write request, before rewrite processing of the target data (dirty data) of the snapshot acquired immediately before is performed, and preventing the data of the snapshot from being written.

When a determination result of S2804 is false (S2804: No), the read/write program 1105 causes the snapshot rewrite program 1106 to execute the snapshot rewrite processing (S2805).

After S2802 or when the determination result of S2804 is true (S2804: Yes), the read/write program 1105 writes the target data of the write request into the cache area secured in S2802 or the cache area obtained through S2805 (S2806). Thereafter, the read/write program 1105 sets the WR generation # of the data written in S2806 to a latest generation # compared in S2804 (S2807), and returns a good response to the server system 202 (S2808).

Figure 29:
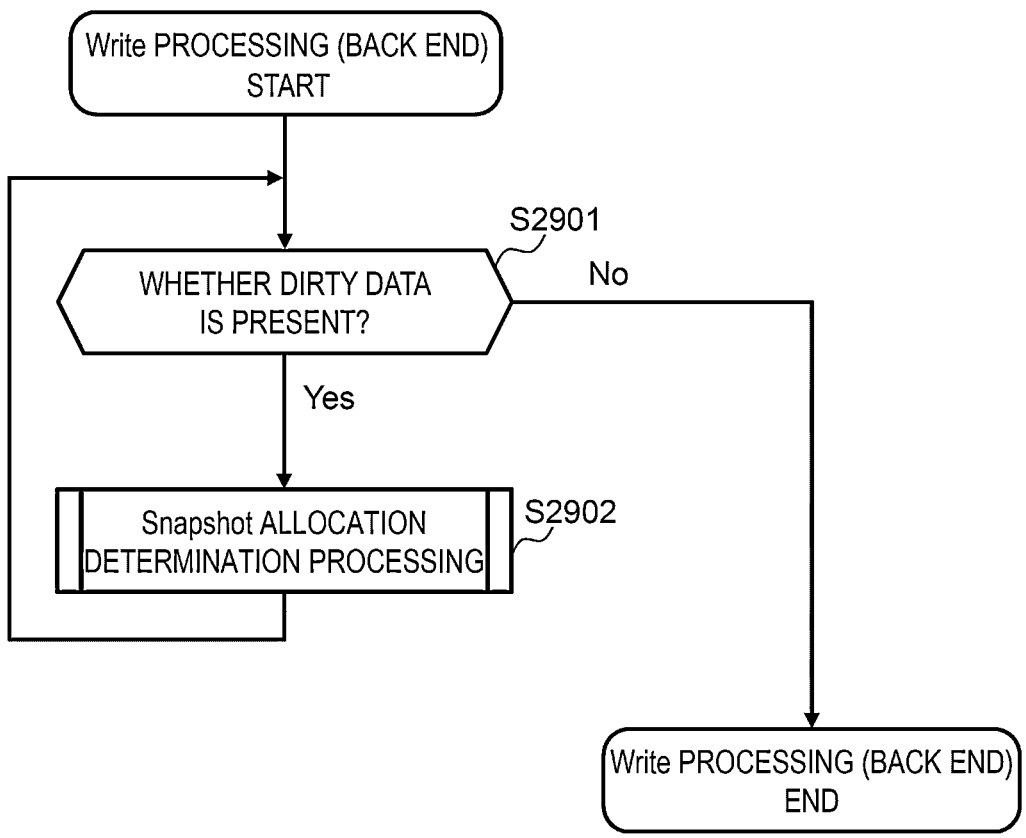
FIG. 29 shows a flow of write processing (back end).

FIG. 29 shows a flow of write processing (back end). The write processing (back end) is processing of writing un-reflected data into the pool 13 when the un-reflected data (dirty data) is present in the cache unit 903. The write processing (back end) is performed in synchronization or non-synchronization with the write processing (front end). The write processing (back end) is executed by the read/write program 1105.

The read/write program 1105 determines whether dirty data is present in the cache unit 903 (S2901). When a determination result of S2901 is true (S2901: Yes), the read/write program 1105 causes the snapshot rewrite program 1106 to execute snapshot allocation determination processing (S2902).

Figure 30:
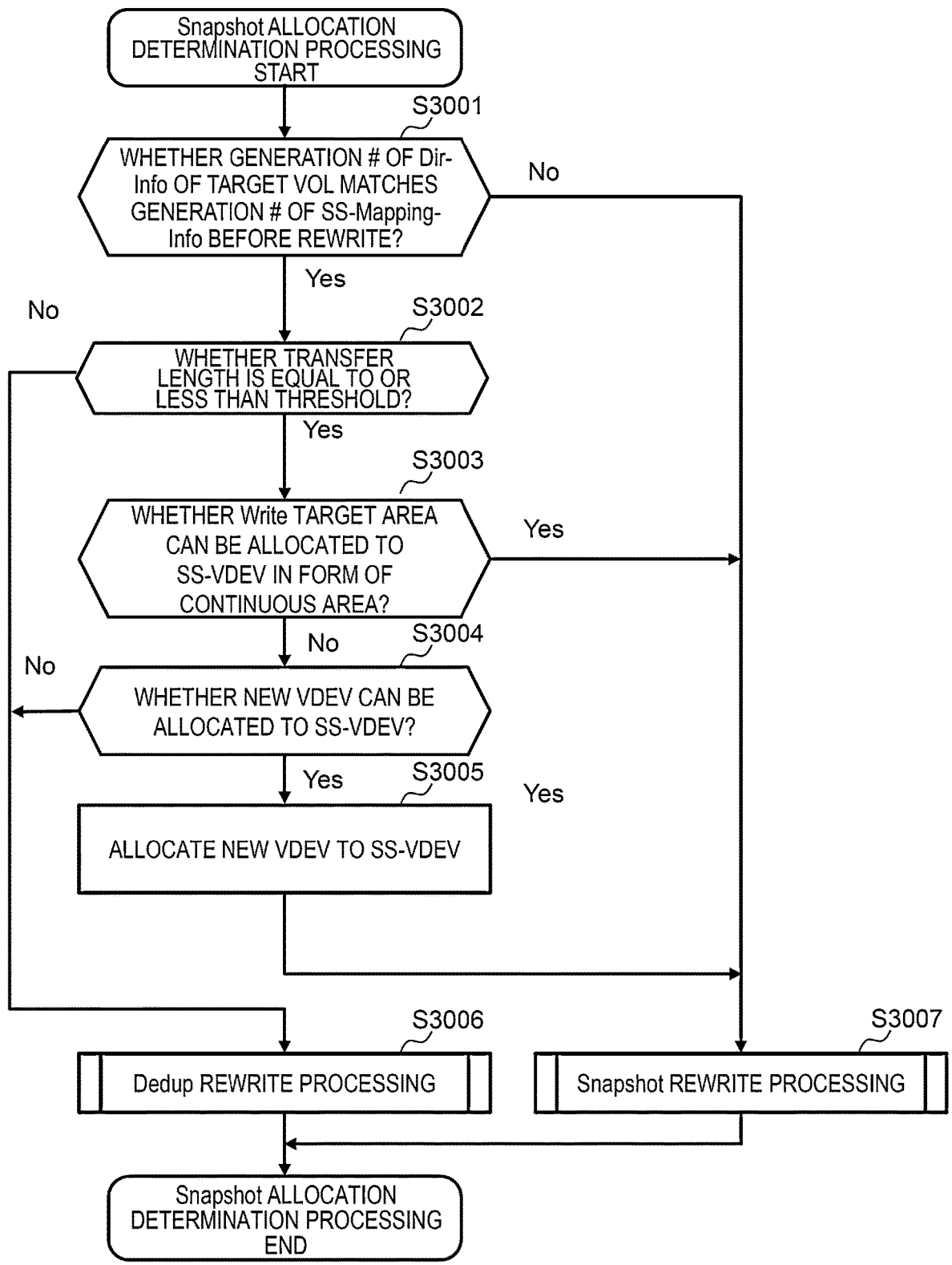
FIG. 30 shows a flow of snapshot allocation determination processing.

FIG. 30 shows a flow of the snapshot allocation determination processing. In the snapshot allocation determination processing, it is determined whether an area on the SS-VDEV 11S is newly allocated to an area on the PVOL 10P of a write request target from a host or an area already allocated on the SS-VDEV 11S is overwritten. The snapshot allocation determination processing is executed by the snapshot allocation determination program from 1113 called the read/write program 1105.

The snapshot allocation determination program 1113 first determines whether a generation # of Dir-Info of a target VOL (a write destination VOL of data) matches the generation # of the SS-Mapping-Info before rewrite (S3001). When a determination result of S3001 is false (S3001: No), the snapshot allocation determination program 1113 executes the snapshot rewrite processing (S3007).

When the determination result of S3001 is true (S3001: Yes), the processing proceeds to S3002. When the determination result of S3001 is true, since data in a range in which the write request is received from the host is in a state (hereinafter, referred to as a single state) that the data is not referred to from another snapshot, by overwriting the same address on the SS-VDEV, it is unnecessary to update the snapshot allocation management table and the SS-Mapping management table.

Next, the snapshot allocation determination program 1113 acquires a transfer length of Write data requested from a host computer, and determines whether the length is less than a threshold (S3002). When the transfer length is equal to or less than the threshold (S3002: Yes), the processing proceeds to S3003. When the transfer length is larger than the threshold (S3002: No), the processing proceeds to S3006. The threshold is set in order to switch between overwriting without allocating a new area on a snapshot space and proceeding to Dedup rewrite processing, and allocating a new area on the snapshot space and collectively updating mapping information (snapshot rewrite processing), which is advantageous in terms of performance. The specific threshold is set according to the actual program implementation and performance characteristics.

Next, the snapshot allocation determination program 1113 determines whether a new area can be allocated to the SS-VDEV in the form of a continuous area for a write target area (S3003). Specifically, with reference to the snapshot allocation management table 1008, it is determined whether an unallocated continuous area can be secured. When it is determined that the allocation is possible (S3003: Yes), the snapshot allocation determination program 1113 executes the snapshot rewrite processing (S3007). When it is determined that the allocation is impossible (S3003: No), the processing proceeds to S3004.

Next, the snapshot allocation determination program 1113 determines whether a new VDEV can be allocated to the SS-VDEV (S3004). When it is determined that the allocation is possible (S3004: Yes), the processing proceeds to S3005, and the new VDEV is allocated to the SS-VDEV. Next, the snapshot allocation determination program 1113 executes snapshot rewrite processing (S3007), and allocates the new area on the SS-VDEV. When it is determined that the new VDEV cannot be allocated (S3004: No), the processing proceeds to S3006, and the overwriting is performed on the SS-VDEV.

In the case of proceeding to S3006, the snapshot allocation determination program 1113 executes the Dedup rewrite processing. In this case, unlike the case of proceeding to the snapshot rewrite processing in S3007, the snapshot allocation determination program 1113 skips the snapshot rewrite processing, and performs overwriting on the same address on the SS-VDEV. Accordingly, it is unnecessary to update the snapshot allocation management table and the SS-Mapping management table.

Figure 31:
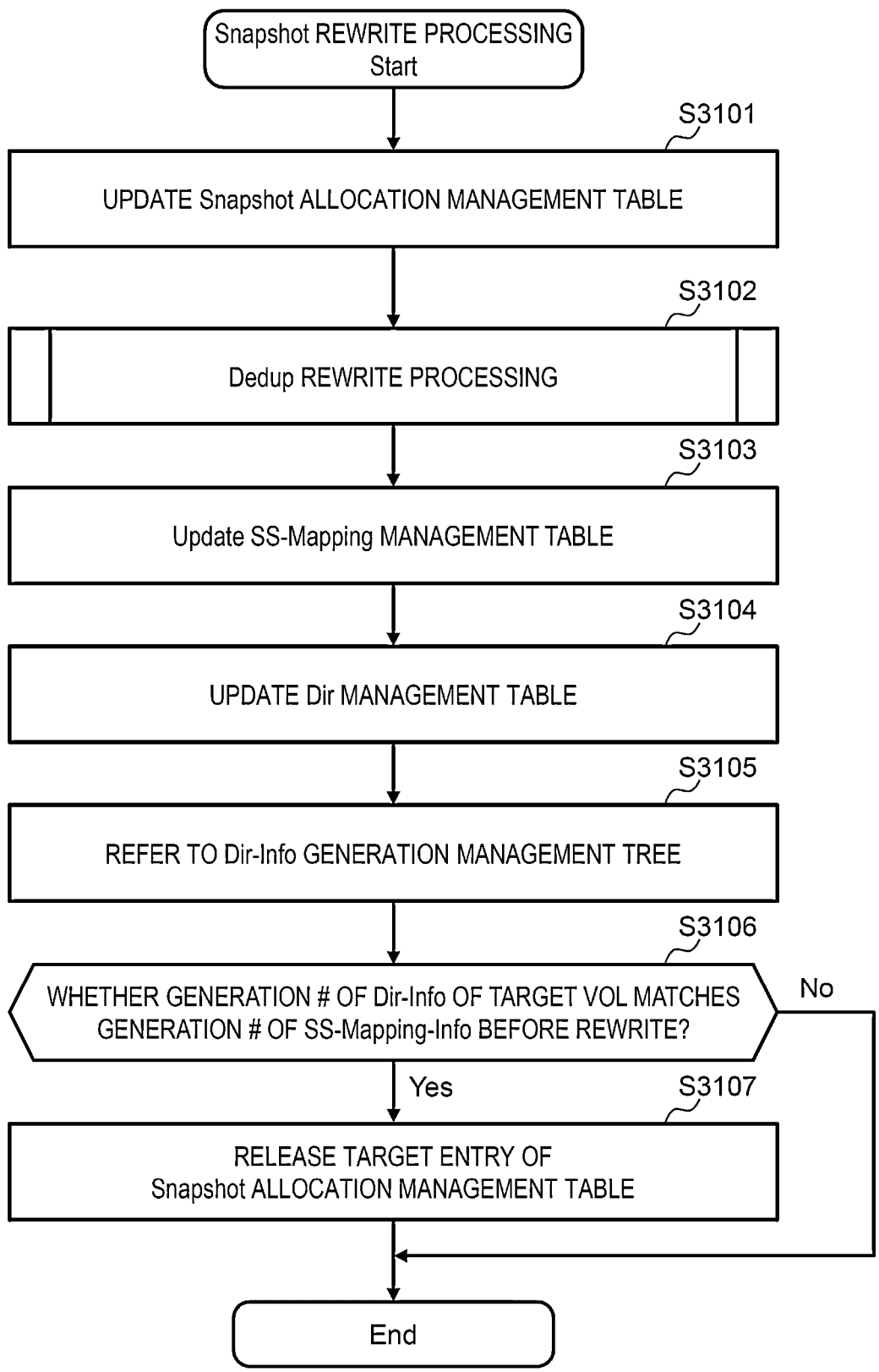
FIG. 31 shows a flow of snapshot rewrite processing.

FIG. 31 shows a flow of the snapshot rewrite processing. The snapshot rewrite processing is processing of newly allocating an area on the SS-VDEV 11S to an area of the PVOL 10P that is a write request target from the host. The snapshot rewrite processing is executed by the snapshot rewrite program 1106 called from the snapshot acquisition program 1101 or the read/write program 1105.

The snapshot rewrite program 1106 secures, by updating the snapshot allocation management table 1008, a new area (a block address whose status 1902 is "0") in the target SS-VDEV 11S (the SS-VDEV 11S corresponding to the SS-Family 9 including the target VOL (for example, an SVOL of an acquisition target or a VOL of a data write destination)) (S3101). Then, the snapshot rewrite program 1106 causes the Dedup rewrite program 1107 to execute the Dedup rewrite processing (S3102).

Thereafter, the snapshot rewrite program 1106 updates the SS-Mapping management table 1010 (S3103). In S3103, for example, the snapshot rewrite program 1106 sets the latest generation # (the generation # indicated by the latest generation table 1005) in the generation #2104 corresponding to Mapping-Info # of a target SS-Mapping-Info. Here, the "target SS-Mapping-Info" is the SS-Mapping-Info corresponding to data in the target VOL.

The snapshot rewrite program 1106 updates the Dir management table 1009 corresponding to the Dir-Info of the target SS-VDEV 11S (S3104). In S3104, SS-Mapping-Info (information indicating the reference destination address in the SS-VDEV) for data to be written is associated with the address of the data in the VOL 10.

The snapshot rewrite program 1106 refers to the generation management tree table 1007 (Dir-Info generation management tree 70) (S3105), and determines whether the generation # of the Dir-Info of the target VOL (data write destination VOL) matches the generation # of the SS-Mapping-Info before rewrite (S3106).

When a determination result of S3106 is true (S3106: Yes), this means that, after data is stored in the area on the SS-VDEV indicated by the SS-Mapping-Info before rewrite, a snapshot that shares the area is not created. That is, it can be determined that the area on the SS-VDEV indicated by the SS-Mapping-Info before rewrite has become garbage. Accordingly, the snapshot rewrite program 1106 releases the target entry of the snapshot allocation management table 1008 (S3107), and ends the processing. At this time, the mapping information to the CR-VDEV or Dedup-VDEV space, corresponding to the area on the SS-VDEV indicated by the SS-Mapping-Info before rewrite, remains valid. That is, the target entry of the SS-Mapping management table 1010 is not initialized.

When the determination result of S3106 is false (S3106: No), this means that after data is stored in the area on the SS-VDEV indicated by the SS-Mapping-Info before rewrite, a snapshot sharing the area is created and the generation # of the DIR-Info is incremented. In this case, the area on the SS-VDEV before rewrite does not become garbage, and the SS-Mapping management table 1010 before rewrite is left as it is, and the processing ends.

Figure 32:
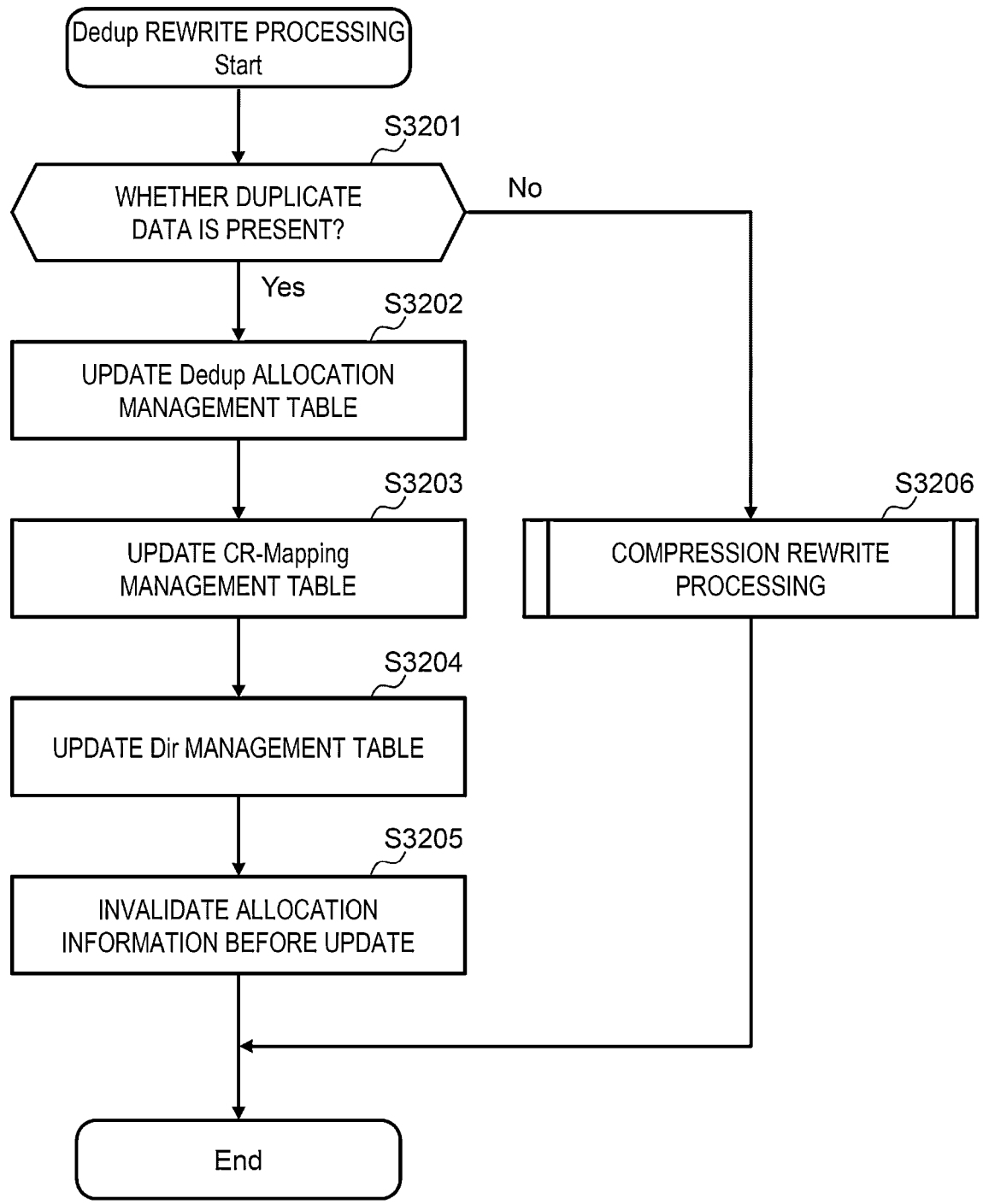
FIG. 32 shows a flow of Dedup rewrite processing.

FIG. 32 shows a flow of the Dedup rewrite processing. The Dedup rewrite processing is executed by the Dedup rewrite program 1107 called from the snapshot rewrite program 1106.

The Dedup rewrite program 1107 determines whether duplicate data is present in data stored in Pool (S3201). Although not described in detail in the drawing, when it is checked whether data of the same content is present for all data, since a calculation amount is large, a representative value of data such as a hash value is calculated by performing calculation or the like using a hash function on each piece of data, and comparison processing is performed only between data having the same representative value. When a determination result of S3201 is false (S3201: No), the Dedup rewrite program 1107 causes the compression rewrite program 1108 to execute compression rewrite processing (S3207). Accordingly, the compressed data of the data whose storage destination is the SS-VDEV 11S is stored in the CR-VDEV 11C without passing through the Dedup-VDEV 11D and without changing the CPU 211 of the processing subject.

When the determination result of S3201 is true (S3201: Yes), the Dedup rewrite program 1107 updates the Dedup allocation management table 1014 (S3202). In S3202, an entry for Dedup allocation information corresponding to data whose storage destination is a target Dedup-VDEV 11D is added to the Dedup allocation management table 1014.

The Dedup rewrite program 1107 updates the CR-Mapping management table 1012 (S3203). In S3203, an entry for CR-Mapping-Info corresponding to data whose storage destination is the Dedup-VDEV 11D is added to the CR-Mapping management table 1012.

The Dedup rewrite program 1107 updates the Dir management table 1009 corresponding to the Dir-Info of the target Dedup-VDEV 11D (S3204). In S3204, CR-Mapping-Info (information indicating the reference destination address in the CR-VDEV 11CC) for the duplicate data is associated with the address of the data in the target Dedup-VDEV 11D. In this manner, the duplicate data is associated with the already stored data, thereby reducing a usage capacity of the Pool.

The Dedup rewrite program 1107 invalidates allocation information before update (S3205). In S3205, the Dedup rewrite program 1107 updates the Dedup allocation management table 1014 and the compression allocation management table 1011. In S3205, garbage collection of a target entry of the compression allocation information is also performed for an area in which the number of allocation destinations in the Dedup allocation management table 1014 is zero.

Figure 33:
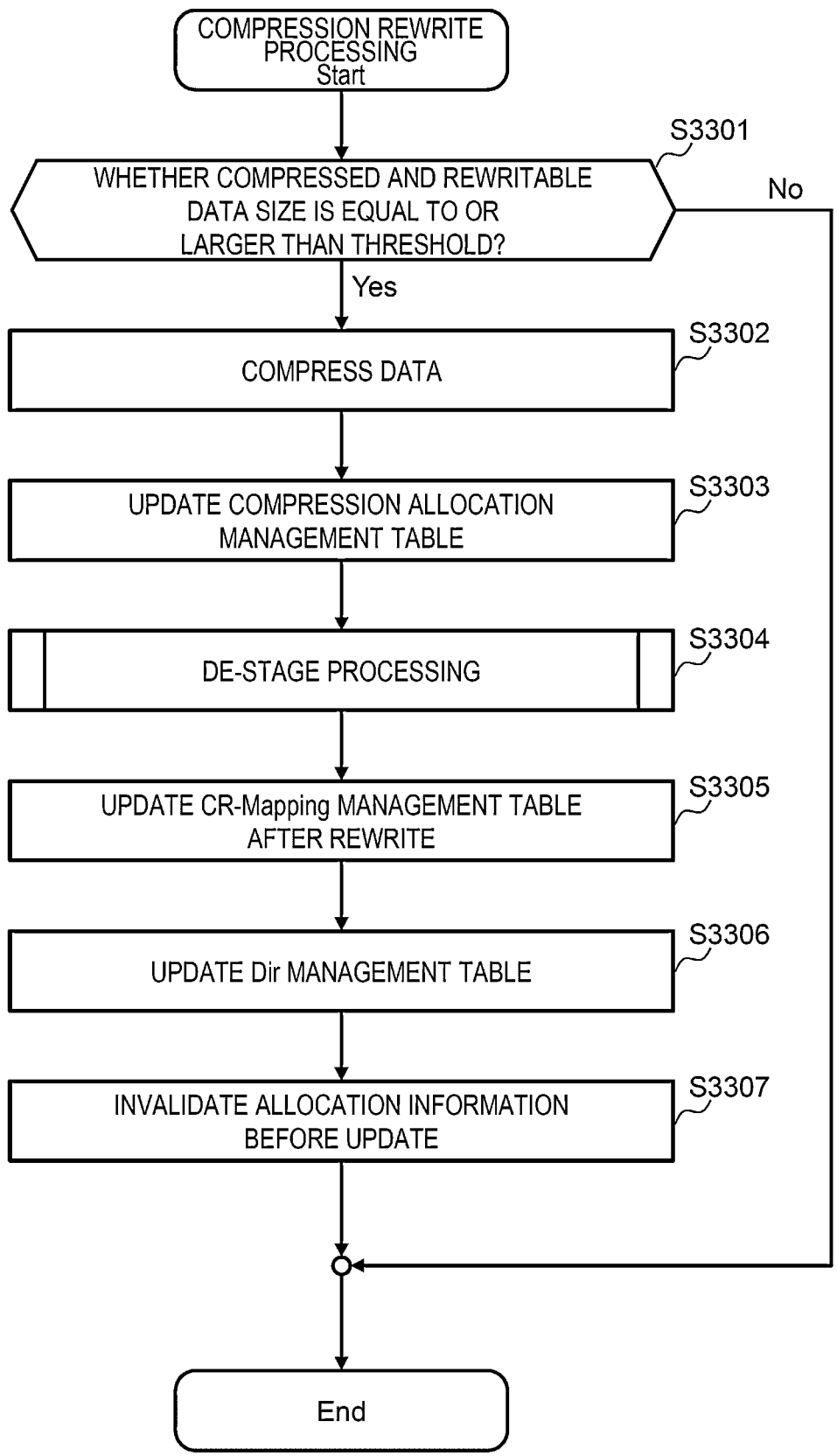
FIG. 33 shows a flow of compression rewrite processing.

FIG. 33 shows a flow of the compression rewrite processing. The compression rewrite processing is executed by the compression rewrite program 1108 called from the Dedup rewrite program 1107.

The compression rewrite program 1108 determines whether compressed and rewritable data length is equal to or larger than a threshold. The data length may be a data length requested by the Dedup rewrite program 1107, or may be a data length including data that has already been stored in a cache memory and has not been compressed and yet been reflected in a drive. It is assumed that the threshold is a predetermined data length, for example, 256 KB or 512 KB, which is a size larger than a unit of mapping for managing snapshots or deduplication. When the data in the cache memory is subjected to the compression rewrite processing, if continuous data is collectively processed as much as possible, update processing of the compression allocation management table (S3303) and update processing of the CR-Mapping management table (S3305), which will be described later, can be collectively updated at once, and processing overhead can be reduced. When a determination result of S3301 is true (S3301: Yes), the compression rewrite program 1108 proceeds to S3302. When the determination result of S3301 is false (S3301: No), the processing ends. In this case, data is temporarily accumulated in an uncompressed state in the cache memory. Accordingly, when another data is written by the host computer, since the data is continuously written in the cache memory by the snapshot rewrite processing, it is possible to reduce overhead of the update processing of the mapping information.

The compression rewrite program 1108 compresses the data to be written (S3302). The compression rewrite program 1108 updates the compression allocation management table 1011 (S3303). In S3303, for each of one or more sub-blocks which is a storage destination for the compressed data in S3302, an entry corresponding to the sub-block is updated.

The compression rewrite program 1108 causes the de-stage program 1109 to execute de-stage processing (S3304).

The compression rewrite program 1108 updates the CR-Mapping management table 1012 after rewrite (S3305).

The compression rewrite program 1108 updates the Dir management table 1009 (S3306).

The compression rewrite program 1108 invalidates the allocation information before update (S3307). In S3307, the Dedup rewrite program 1107 updates the Dedup allocation management table 1014 and the compression allocation management table 1011. In S3307, garbage collection of a target entry of the compression allocation information is also performed for an area in which the number of allocation destinations in the Dedup allocation management table 1014 is zero.

Figure 34:
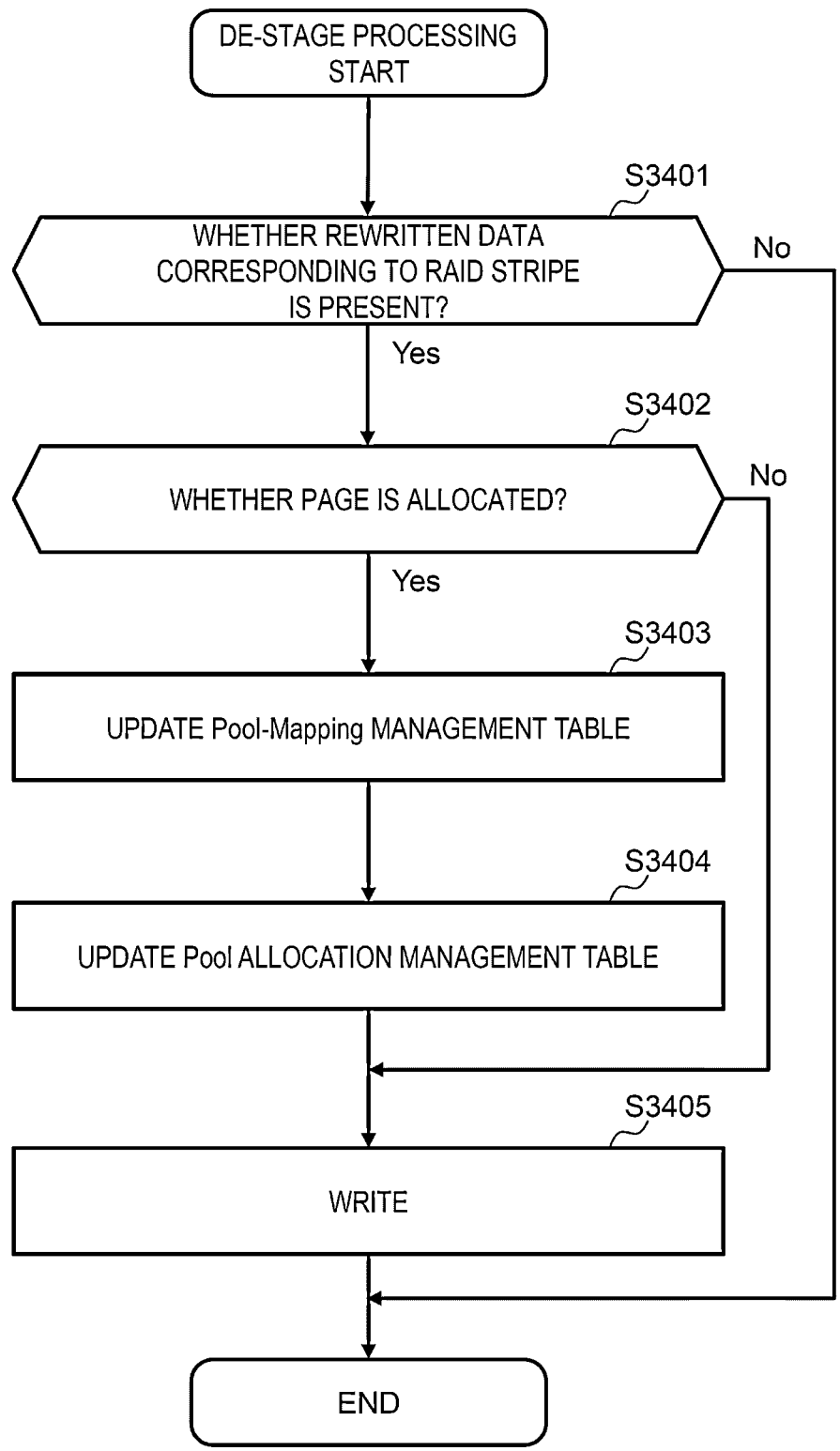
FIG. 34 shows a flow of de-stage processing.

FIG. 34 shows a flow of the de-stage processing. The de-stage processing is executed by the de-stage program 1109 called from the compression rewrite program 1108.

The de-stage program 1109 determines whether rewritten data (one or more pieces of compressed data) corresponding to a RAID stripe is present in the cache unit 903 (S3401). The "RAID stripe" is a stripe in a RAID group (a storage area extending over the plurality of SSDs 220 constituting the RAID group). When a RAID level of the RAID group requires parity, a size of the "rewritten data corresponding to the RAID stripe" may be a size obtained by subtracting a size of the parity from a size of the stripe. When a determination result of S3401 is false (S3401: No), the processing ends.

When the determination result of S3401 is true (S3401: Yes), the de-stage program 1109 refers to the Pool-Mapping management table 1015, and determines whether the page 14 is allocated to the storage destination (the address in the CR-VDEV 11C) of the rewritten data corresponding to the RAID stripe (S3402). When a determination result of S3402 is false (S3402: No), the processing proceeds to S3405.

When the determination result of S3402 is true (S3402: Yes), the de-stage program 1109 updates the Pool allocation management table 1016 (S3403). Specifically, the de-stage program 1109 allocates the page 14. In S3403, an entry (for example, the status 2704, the allocation destination VDEV #2705, and the allocation destination address 2706) corresponding to the allocated page 14 in the Pool allocation management table 1016 is updated.

The de-stage program 1109 registers the page #2602 of the allocated page in the entry corresponding to the storage destination for the rewritten data corresponding to the RAID stripe in the Pool allocation management table 1016 (S3404).

The de-stage program 1109 writes the rewritten data corresponding to the RAID stripe into a stripe which is the base of the page (S3405). When the RAID level is a RAID level requiring parity, the de-stage program 1109 generates parity based on the rewritten data corresponding to the RAID stripe, and also writes the parity into the stripe.

Figure 35:
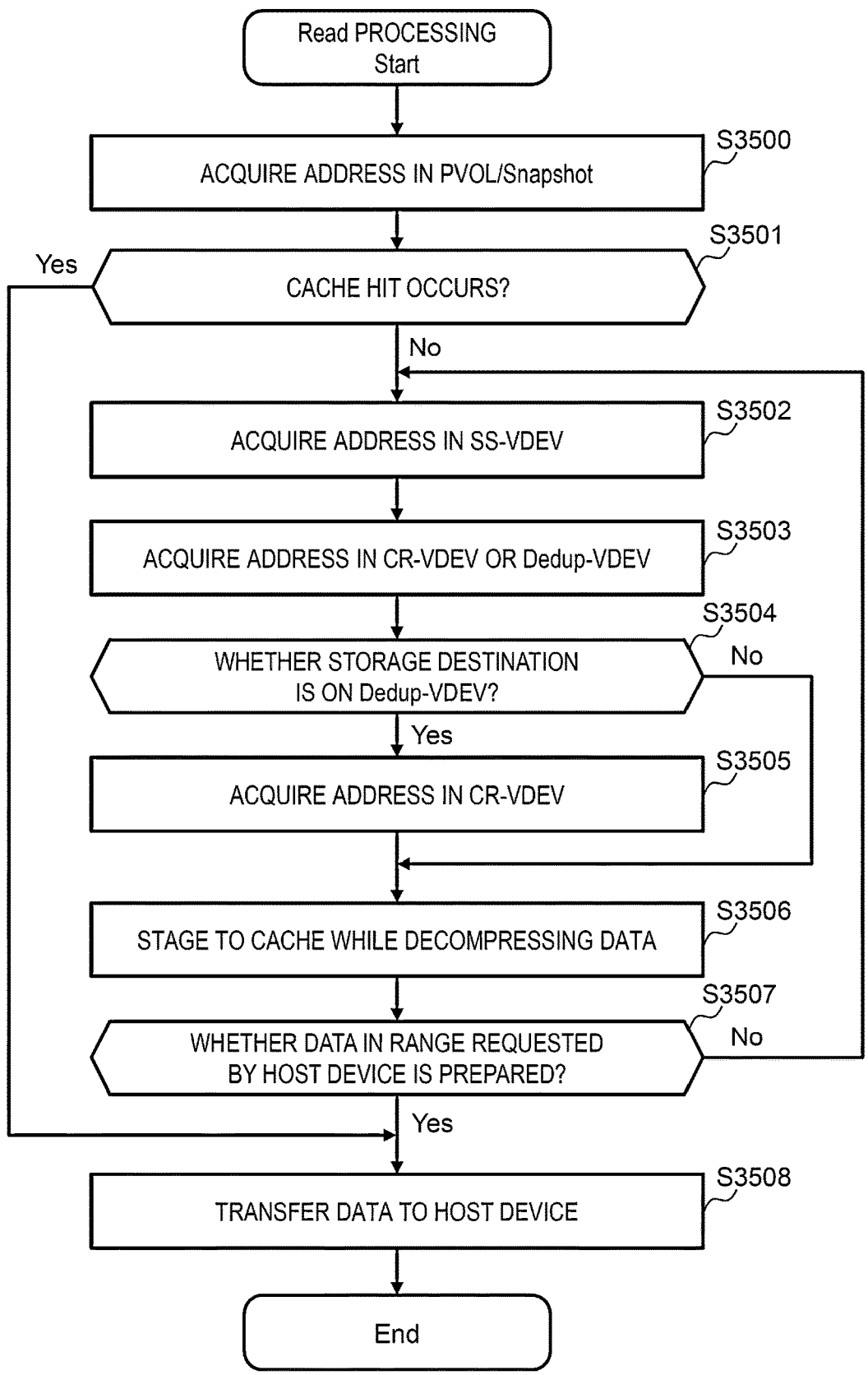
FIG. 35 shows a flow of read processing.

FIG. 35 is a flowchart of a processing procedure of read processing. The read processing is executed by the read/write program 1105 according to a read request from a host device.

First, in S3500, the read/write program 1105 acquires an address in a PVOL or a snapshot of data targeted by a read request from the server system 202. Next, in S3501, the read/write program 1105 determines whether a cache hit occurs in the target data of the read request. The read/write program 1105 shifts the processing to S3508 when the cache hit occurs in the target data of the read request (S3501: Yes), and shifts the processing to S3502 when the cache hit does not occur in the target data (S3501: No).

In S3502, the read/write program 1105 refers to the Dir management table 1009 and the SS-Mapping management table 1010, and acquires the address on the reference destination SS-VDEV based on the address in the PVOL/snapshot acquired in S3500. At this time, when a size of the target data of the read request is larger than a management unit of the SS-Mapping management table 1010, all entries are referred to, and the address on the SS-VDEV is acquired.

Next, in S3503, the read/write program 1105 refers to the Dir management table 1009 and the CR-Mapping management table 1012, and acquires the address in the CR-VDEV or the Dedup-VDEV based on the address in the SS-VDEV acquired in S3502.

Next, in S3504, it is determined whether the reference destination address acquired in S3503 is on the Dedup-VDEV. Specifically, the read/write program 1105 acquires the reference destination CR-VDEV #2303 in the CR-Mapping management table 1012, refers to the CR-VDEV management table 1002, and specifies the VDEV #1301 in which the CR-VDEV #2303 matches the CR-VDEV #1302. When a determination result of S3504 is false (S3504: No), the read/write program 1105 proceeds to S3506. On the other hand, when the determination result of S3504 is true (S3504: Yes), the read/write program 1105 refers to the Dir management table 1009 and the CR-Mapping management table 1012 based on the address in the Dedup-VDEV specified in S3503, and acquires the address in the CR-VDEV (S3505).

Next, in S3506, the read/write program 1105 stages, to the cache memory, the data stored in the address of the CR-VDEV specified in S3503 or S3505 while decompressing the data.

Next, the read/write program 1105 determines whether all data in a range requested by the host device is read out onto a cache (S3507). When the determination result is true, the read/write program 1105 proceeds to S3508, transfers, to the host device, the data in which the cache hit occurs in S3501 or the data staged in S3506, and ends the processing.

On the other hand, when the result of S3507 is false (S3507: No), the read/write program 1105 returns to S3502, and re-stages the data which is insufficient in the cache. In this manner, when the data in the range requested by the host is stored in a continuous area on the CR-VDEV, the data can be aligned on the cache only once staged from the drive. However, when the data is stored in a distributed manner on the SS-VDEV, the Dedup-VDEV, or the CR-VDEV, since reference of metadata or staging work from the drive occurs a plurality of times, the throughput performance deteriorates.

Figure 36:
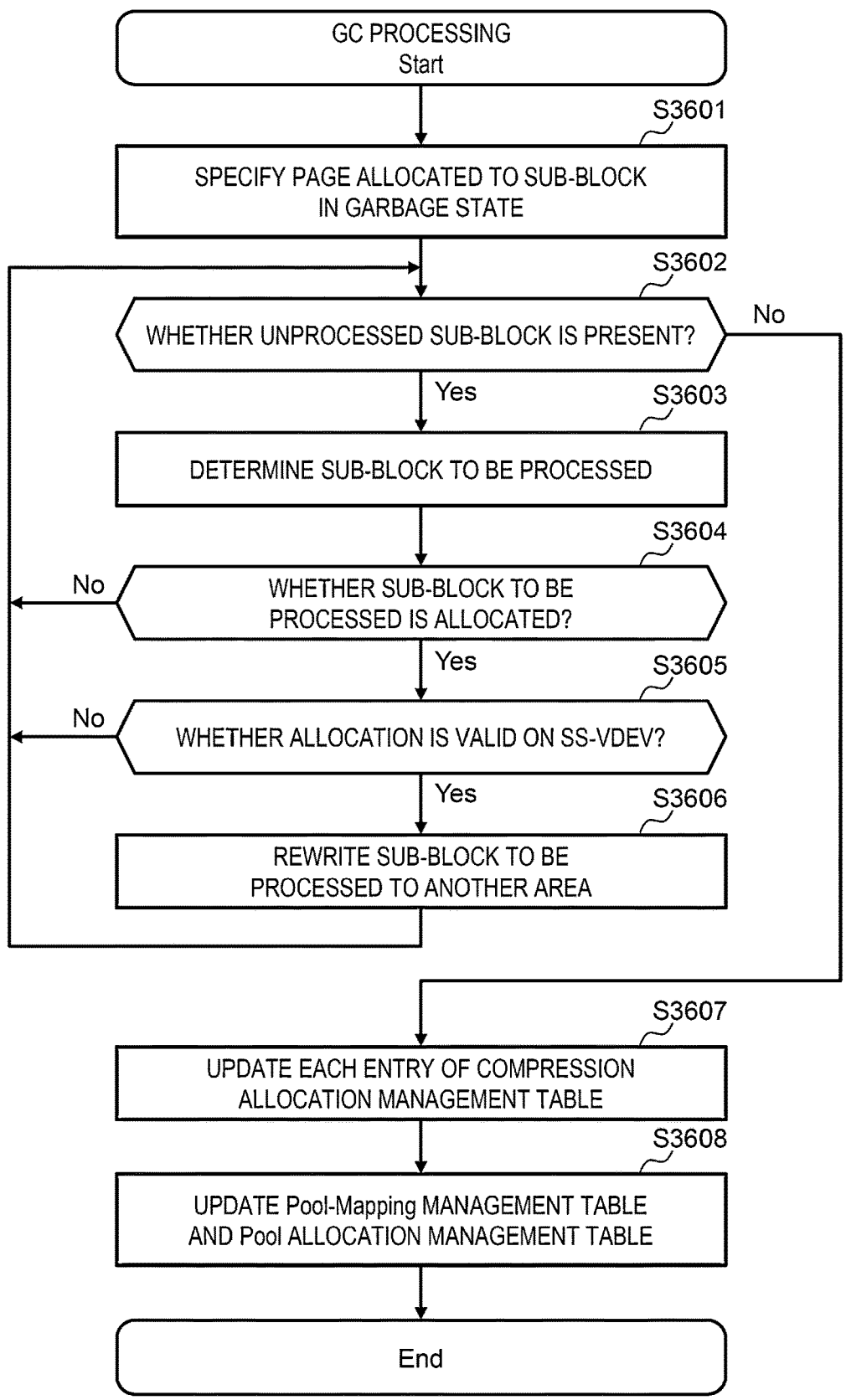
FIG. 36 shows a flow of GC (garbage collection) processing.

FIG. 36 shows a flow of GC (garbage collection) processing. The GC processing is executed by the GC program 1110, for example, periodically (or in response to an instruction from the management system 203).

The GC program 1110 refers to the Pool-Mapping management table 1015 and the compression allocation management table 1011, and specifies a page including a sub-block in a garbage state (status 2203 "2") (S3601). When there is no page including a sub-block in the garbage state, the GC processing may be ended. In S3601, the GC program 1110 may preferentially select the CR-VDEV 11C having the smallest empty area among the plurality of CR-VDEVs 11C. In S3601, the GC program 1110 may preferentially specify a page having the largest number of sub-blocks in the garbage state among the CR-VDEV 11C. The GC may be performed in an area unit different from the page 14.

The GC program 1110 determines whether an unprocessed sub-block (which has not yet been determined in S3603) is present in the page specified in S3601 (S3602).

When a determination result of S3602 is true (S3602: Yes), the GC program 1110 refers to the compression allocation management table 1011 and determines a sub-block to be processed (S3603). The GC program 1110 determines whether the status 2203 corresponding to the sub-block to be processed is "1" (allocated) (S3604). When a determination result of S3604 is false (S3604: No), the processing returns to S3602. When the determination result of S3604 is true (S3604: Yes), the GC program 1110 determines whether the allocation of the sub-block to be processed is also valid on the SS-VDEV (S3605). Specifically, the GC program 1110 refers to the compression allocation management table 1011, and specifies the address on the SS-VDEV, to which the sub-block to be processed is allocated, by specifying the allocation destination VDEV 2205 and the allocation destination address 2206 of the entry corresponding to the sub-block to be processed. Then, by referring to the snapshot allocation management table 1008, it is determined whether the status 1902 of the entry corresponding to the address on the SS-VDEV is 1 (allocated). When the status 1902 is 1 (allocated), it is determined that the allocation of the sub-block to be processed is also valid on the SS-VDEV.

When a determination result of S3605 is false (S3605: No), the processing returns to S3602. When the determination result of S3605 is true (S3605: Yes), the GC program 1110 rewrites the sub-block to be processed to another area (S3606). The "another area" may be a free sub-block (a sub-block whose status 2203 is "0") in a CR-VDEV 11C different from the CR-VDEV 11C subjected to the GC processing (the CR-VDEV 11C including the allocation destination sub-block of the page specified in S3601). The "another CR-VDEV 11C" may be a CR-VDEV 11C in which all sub-blocks are free sub-blocks. The page 14 may be allocated to the "another area", and the compressed data in the sub-block to be processed may be written into the page 14 (in other words, the compressed data may be moved, to the page allocated to the another area, from the page allocated to the sub-block to be processed).

When the determination result of S3602 is false (S3602: No), the GC program 1110 updates all entries of the compression allocation management table 1011 corresponding to the CR-VDEV 11C subjected to the GC processing (S3607). In S3607, for example, the statuses 2203 of all the entries is "0".

The GC program 1110 updates the Pool-Mapping management table 1015 and the Pool allocation management table 1016 (S3608). In S3806, for example, the pages #2602 of all the entries of the Pool-Mapping management table 1015 corresponding to the CR-VDEV 11C subjected to the GC processing may be initialized, and the statuses 2704 corresponding to all the pages allocated to the CR-VDEV 11C subjected to the GC processing may be set to "0" (free).

In this manner, the GC processing according to the embodiment may move valid compressed data (compressed data in an allocated sub-block) between the CR-VDEVs 11C in order to set a plurality of allocated sub-blocks in a discontinuous state into a continuous state. Setting the plurality of allocated sub-blocks in the discontinuous state to the continuous state may be performed without moving data between the CR-VDEVs 11C.

As described above, the storage system 201 of the disclosure includes the SSD 220 as a storage device and the processor 211 that accesses the storage device. The processor 211 manages, as a snapshot family 9, a primary volume 10P to be read and written by a host and a snapshot volume 10S generated from the primary volume 10P. The processor 211: uses a snapshot virtual device 11S, which is a logical address space associated with the snapshot family 9, as a storage destination for data of the primary volume 10P and the snapshot volume 10S; compresses data stored in the snapshot virtual device, and stores the compressed data in a compression virtual device; and stores the data stored in the compression virtual device in the storage device. When a write request is received from the host, the processor 211 switches, according to a size of an address range of a write destination, between overwriting processing of overwriting an area on the snapshot virtual device 11S which is allocated to large-size data and new allocation processing of allocating a new area on the snapshot virtual device 11S to the address range of the write destination for small-size data; and compresses a plurality of pieces of small-size data stored in the new area, and collectively stores the plurality of pieces of small-size data in the compression virtual device.

Therefore, in a storage system that provides a snapshot, a high throughput performance can be implemented by optimizing an update amount and a data transfer amount of mapping information according to a data length written from a host and a mapping state and switching allocation of a virtual device area.

That is, in a case of random writing, the subdivided data can be collectively moved from the snapshot virtual device to the compression virtual device, thereby improving the throughput performance.

New continuous areas on the snapshot virtual device are allocated to the plurality of pieces of small-size data.

Therefore, it is possible to efficiently store data from the snapshot virtual device to the compression virtual device.

The processor 211 uses a snapshot allocation management table 1008 indicating mapping from an address in the snapshot virtual device 11S to an address in the primary volume and/or the snapshot volume, and manages whether an address in the snapshot virtual device 11S is allocated to an address of any volume. When the processor 211 receives the write request and performs the new allocation processing, the processor 211 updates the snapshot allocation management table 1008 such that the area of the snapshot virtual device 11S allocated to the address range of the write destination before the new allocation processing is an area not allocated to the address of any volume. When performing garbage collection processing, the processor 211 specifies an address of the snapshot virtual device 11S referred to by a storage area of the compression virtual device which is a candidate for collection, refers to the snapshot allocation management table 1008 for the specified address, and sets a fact that the storage area is an area not allocated to the address of any volume as a condition of the collection.

By using this processing, it is not necessary to update the SS-Mapping management table 1010 or the like during writing, and the write processing can be accelerated. This is because the size of the snapshot allocation management table 1008 is small, and the update of the snapshot allocation management table 1008 is completed in a time shorter than the update of the SS-Mapping management table 1010 or the like. The SS-Mapping management table 1010 is updated when the rewritten data is collectively reflected in the storage device. During garbage collection, in addition to a condition that the status 2203 of the compression allocation management table 1011 indicates "garbage collection necessary", it is checked whether the allocation on the snapshot virtual device is valid using the snapshot allocation management table 1008, so that a target of the garbage collection can be accurately determined without updating the CR-Mapping management table 1012 during writing.

The processor 211 performs the overwriting processing on the condition that there is no reference from the snapshot volume 10S to the address range of the write destination and the address range of the write destination has a transfer length equal to or greater than a threshold on the snapshot virtual device 11S. When the transfer length is less than the threshold, the new allocation processing is performed.

When a plurality of volumes belonging to the same snapshot family 9 contain same data, the storage system of the disclosure allocates a predetermined area on the snapshot virtual device 11S to the same data, and the plurality of volumes refer to the predetermined area.

Therefore, it is possible to efficiently manage data referred to by a snapshot.

When a plurality of volumes belonging to different snapshot families 9 contain same data, the storage system of the disclosure allocates a predetermined area on a deduplication virtual device 11D referred to by the snapshot virtual device 11S to the same data.

Therefore, it is possible to efficiently manage duplicate data.

The processor 211 includes information related to a generation of a snapshot in mapping information for managing a correspondence between an address in a volume belonging to the snapshot family 9 and an area on the snapshot virtual device 11S, and performs the new allocation processing when a generation of the address range of the write destination and a latest generation do not match.

Therefore, it is possible to efficiently manage whether the write destination is independent data.

The invention is not limited to the above-described embodiment, and includes various modifications. For example, the above-described embodiment has been described in detail to facilitate understanding of the invention, and the invention is not necessarily limited to including those all the configurations described above. The configurations may not only be deleted, but also be replaced or added.

What is claimed is:

1. A storage system comprising:
   a storage device; and
   a processor configured to access the storage device, wherein
   the processor manages a snapshot family having a primary volume to be read and written by a host and a snapshot volume generated from the primary volume,
   wherein when receiving a write request from the host, the processor;
      stores data, which is written to the primary volume and the snapshot volume, which are included in the snapshot family in a snapshot virtual device which is a logical address space associated with the snapshot family,
      compresses the data stored in the snapshot virtual device, and stores the compressed data in a compression virtual device, and
      stores the data stored in the compression virtual device in the storage device; and
   wherein when storing the data in the snapshot virtual device and the compression virtual device, the processor:
   selectively performs the following processing (i) and (ii), according to a size of an address range of a write destination regarding the write request to update data:
      (i) overwriting processing comprising:
         overwriting large-size updated data to an area on the snapshot virtual device, which has been allocated to pre-update data,
         compressing the large-size data stored by overwriting, and
         storing the compressed large-size data in the compression virtual device, and
      (ii) new allocation processing comprising:
         allocating a new area on the snapshot virtual device for small-size updated data,
         storing the small-size updated data in the new area,
         compressing a plurality of pieces of the small-size data stored in the new area, and
         collectively storing the plurality of pieces of the compressed small-size data in the compression virtual device.

2. The storage system according to claim 1, wherein new continuous areas on the snapshot virtual device are allocated to the plurality of pieces of small-size data.

3. The storage system according to claim 1, wherein the processor:
   stores a snapshot allocation management table indicating mapping from an address in the snapshot virtual device to an address in the primary volume and/or the snapshot volume, and
   manages whether an address in the snapshot virtual device is allocated to an address of any volume,
   when the processor receives the write request and performs the new allocation processing, the processor;
      updates the snapshot allocation management table such that the area of the snapshot virtual device allocated to the address range of the write destination before the new allocation processing is an area not allocated to the address of any volume, and
   when performing garbage collection processing, the processor:
      specifies an address of the snapshot virtual device referred to by a storage area of the compression virtual device which is a candidate for collection,
      refers to the snapshot allocation management table for the specified address, and
      sets a fact that the storage area is an area not allocated to the address of any volume as a condition of the collection.

4. The storage system according to claim 1, wherein the processor performs the overwriting processing when there is no reference from the snapshot volume to the address range of the write destination and a data length of the write request is equal to or larger than a threshold, and performs the new allocation processing when the data length is less than the threshold.

5. The storage system according to claim 1, wherein when a plurality of volumes belonging to the same snapshot family contain same data, a predetermined area on the snapshot virtual device is allocated to the same data, and the plurality of volumes refer to the predetermined area.

6. The storage system according to claim 1, wherein when a plurality of volumes belonging to different snapshot families contain same data, a predetermined area on a deduplication virtual device referred to by the snapshot virtual device is allocated to the same data.

7. The storage system according to claim 1, wherein the processor
includes information related to a generation of a snapshot in mapping information for managing a correspondence between an address in a volume belonging to the snapshot family and an area on the snapshot virtual device, and
performs the new allocation processing when a generation of the address range of the write destination and a latest generation do not match.

8. The storage system according to claim 3, wherein
when there is no reference from the snapshot volume to the address range of the write destination and a data length of the write request is equal to or larger than a threshold, the processor:
  determines whether an area necessary for the new allocation processing is present on the snapshot virtual device,
  performs the allocation when the necessary area is present, and
  performs the new allocation processing after expanding the snapshot virtual device when the necessary area is not present.

9. A data processing method for a storage system including a storage device and a processor that accesses the storage device, the data processing method comprising:
  managing, by the processor, a snapshot family having a primary volume to be read and written by a host and a snapshot volume generated from the primary volume;
  storing, by the processor, data that is written to the primary volume and the snapshot volume, which are included in the snapshot family in a snapshot virtual device which is a logical address space associated with the snapshot family;
  compressing, by the processor, the data stored in the snapshot virtual device, and storing the compressed data in a compression virtual device; and
  storing the data stored in the compression virtual device in the storage device;
wherein when storing the data in the snapshot virtual device and the compression virtual device, the data processing method comprises, selectively performing the following processing (i) and (ii), by the processor, according to a size of an address range of a write destination regarding the write request to update data:
  (i) overwriting processing comprising:
    overwriting large-size updated data to an area on the snapshot virtual device, which has been allocated to pre-update data,
    compressing the large-size data stored by overwriting, and
    storing the compressed large-size data in the compression virtual device, and
  (ii) new allocation processing comprising:
    allocating a new area on the snapshot virtual device to the address range of the write destination for small-size updated data,
    storing the small-size updated data in the new area,
    compressing a plurality of pieces of the small-size data stored in the new area, and
    collectively storing the plurality of pieces of the compressed small-size data in the compression virtual device.

* * * * *